Figure 1:
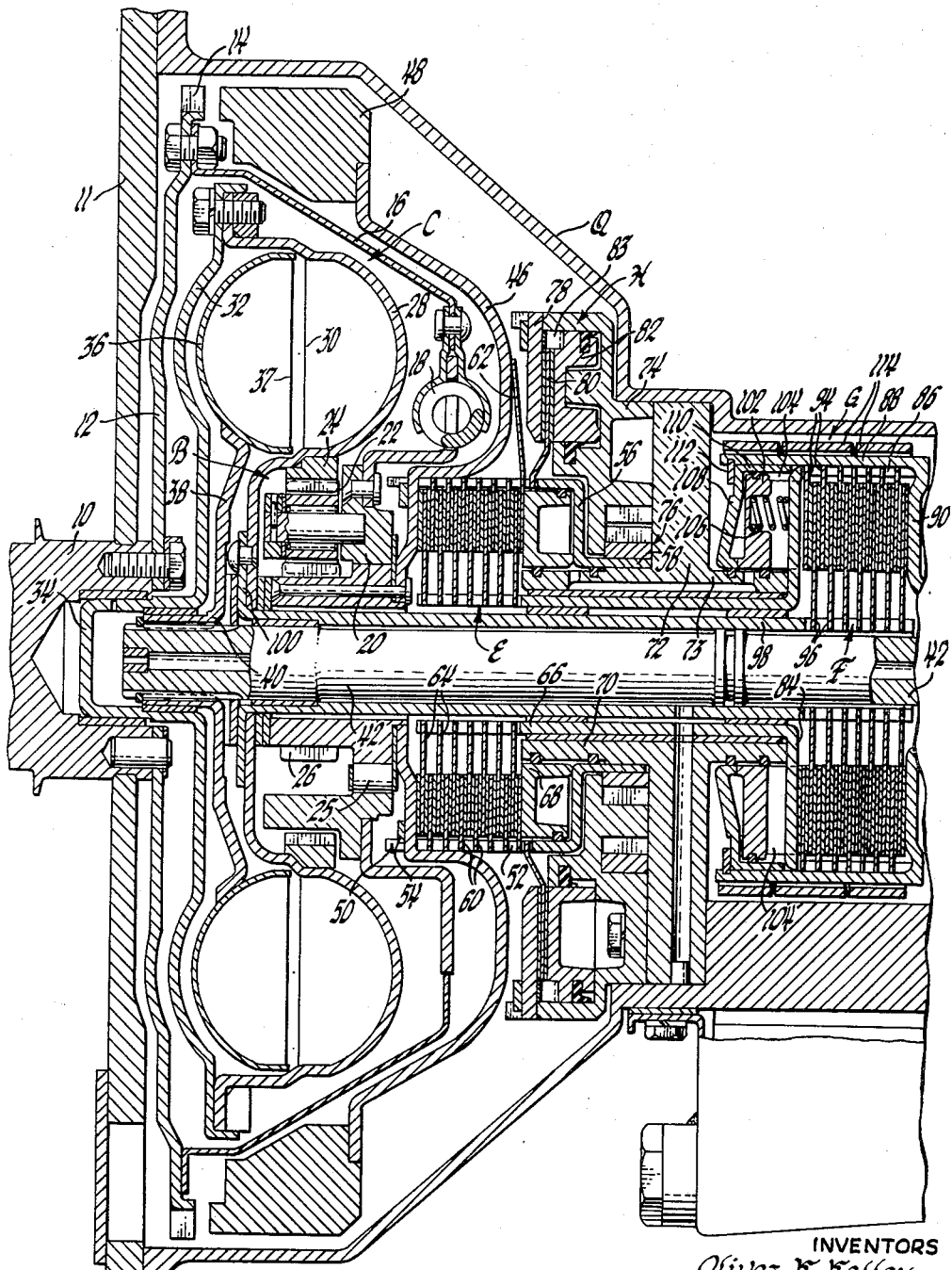

March 6, 1962 — O. K. KELLEY ETAL — 3,023,636
BALANCED INERTIA PLURAL STEP-RATIO TRANSMISSIONS
Filed April 29, 1955 — 4 Sheets-Sheet 1

INVENTORS
Oliver K. Kelley,
Stanley L. Buckay &
Paul King
BY
W. C. Middleton
ATTORNEY INVENTORS
Oliver K. Kelley,
Stanley L. Buckay &
Paul King
BY
W. C. Middleton
ATTORNEY

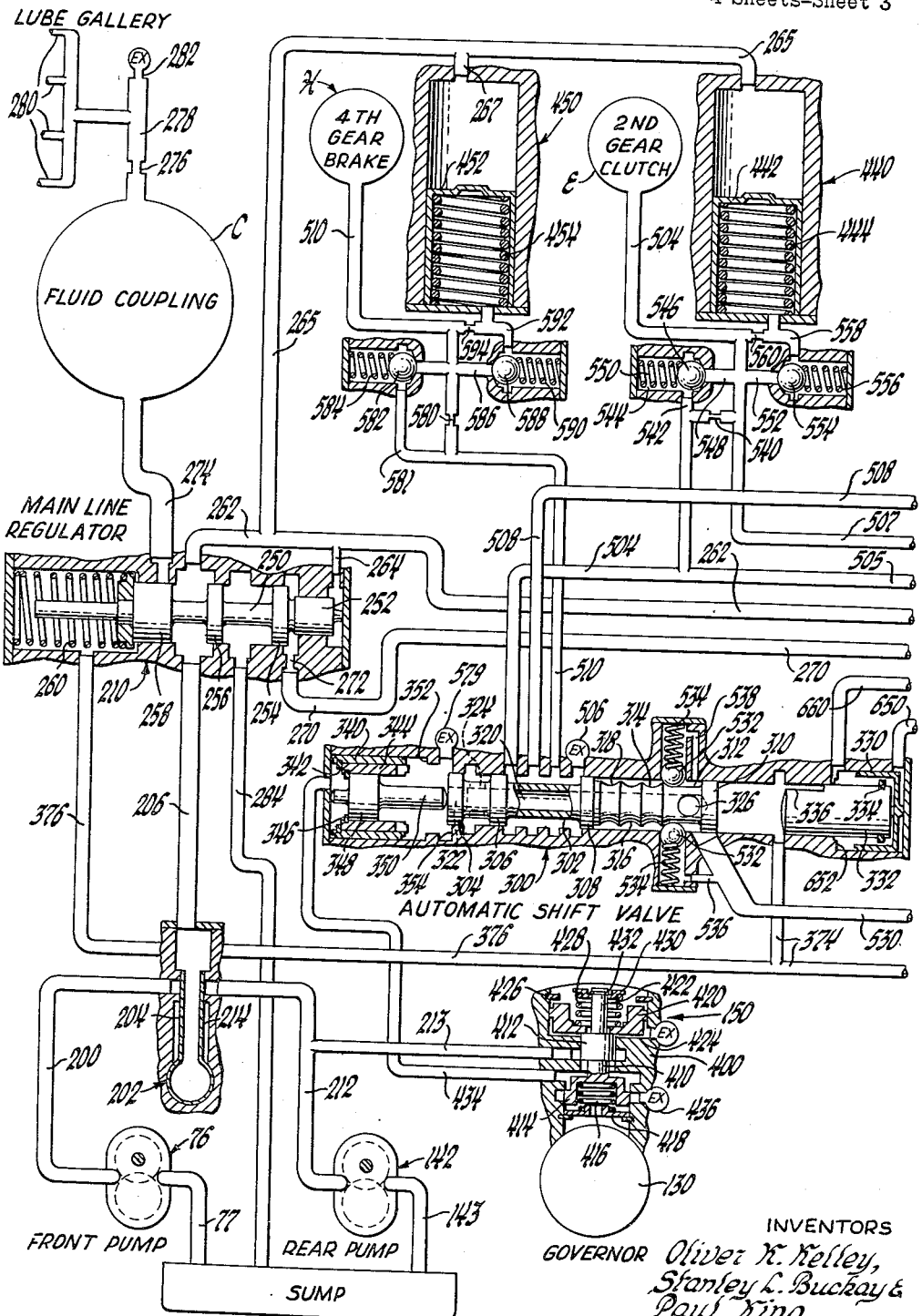

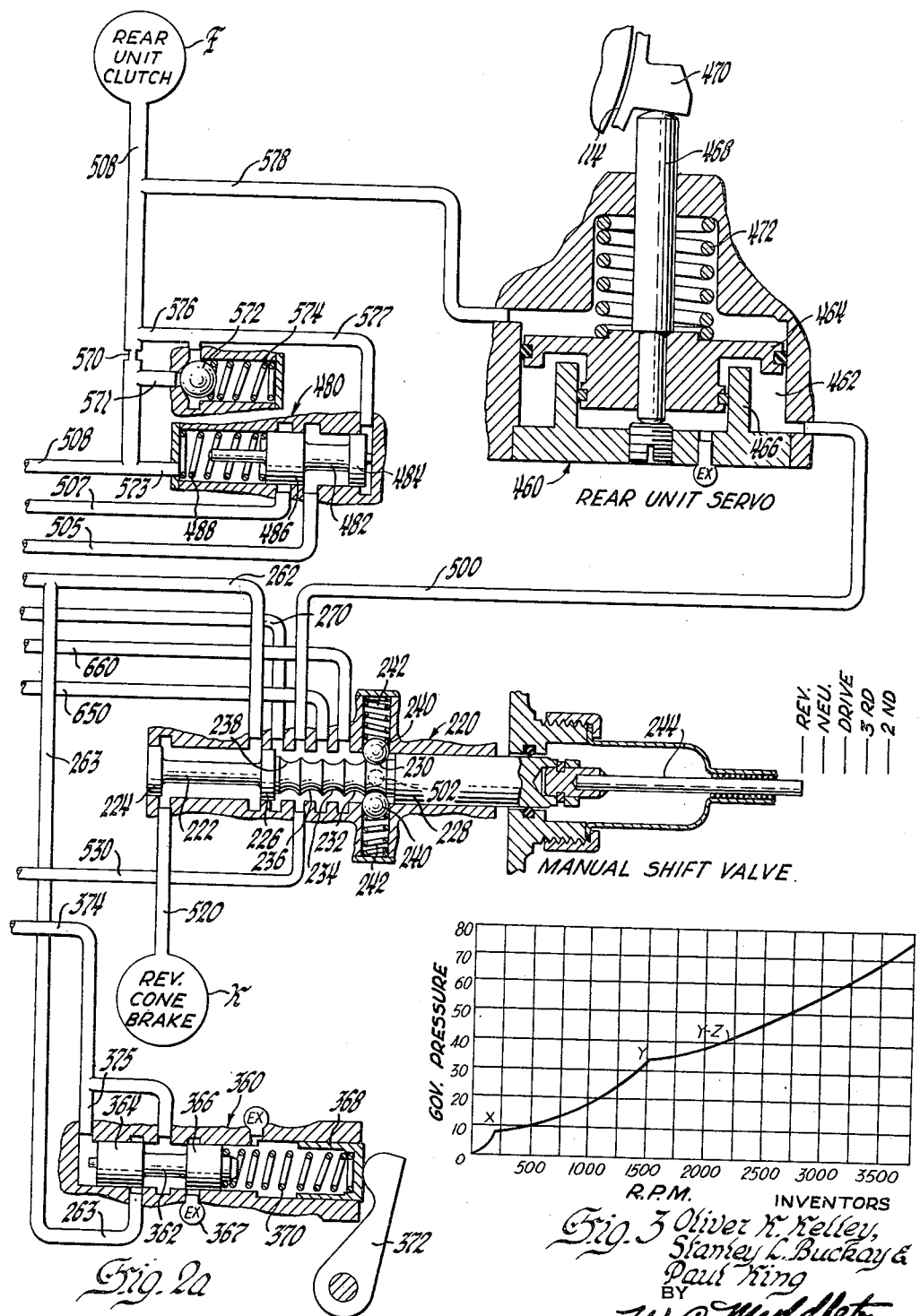

United States Patent Office 3,023,636
Patented Mar. 6, 1962

3,023,636
BALANCED INERTIA PLURAL STEP-RATIO
TRANSMISSIONS
Oliver K. Kelley, Bloomfield Hills, Stanley L. Buckay, Birmingham, and Paul J. King, Royal Oak, Mich., assignors to General Motors Corporation, Detroit, Mich., a corporation of Delaware
Filed Apr. 29, 1955, Ser. No. 504,992
52 Claims. (Cl. 74—677)

This invention relates to improvements in automatic transmissions and more particularly to improvements in balanced inertia plural step-ratio transmissions.

In the operation of transmissions particularly for motor vehicles wherein a plurality of gear ratios can be established by the application of brakes to lock parts against rotation, or the application of clutches to cause parts to rotate in unison, some objectionable shock or jar has been occasioned when parts are compelled to rotate in unison by the application of a clutch. For example, in the establishment of a speed ratio by the clutching together of two or more parts such action involves a deceleration of rotating masses and the acceleration of other rotating or rotatable masses. If the clutching action comprises an engagement of the clutch elements at a gradual controlled rate with final smooth locking of parts together, jar or shock of an appreciable nature would not be encountered but such theoretic action is extremely difficult to obtain in actual practice. The clutch elements can be engaged with an initial fast movement followed by a retarded movement with final locking together of elements. If the masses so locked together have unbalanced moments of inertia it follows that the final locking will cause a jar or shock due to such unbalanced inertia.

Also in transmissions of the type wherein changes in gear or speed ratio are extended over several steps, and in which a plurality of planetary gear units are employed for the transmission of torque, some changes in gear ratio will involve a change in the condition of each gear unit at the same time. For example, in one type of planetary gear transmission a shift from one gear ratio to another involves a change in the first unit from direct drive to reduction drive and coordinated therewith a change in the rear unit from reduction drive to direct drive. The change in the two units is accomplished by the release of brakes and the application of clutches, or vice versa, in timed relation but smoothness and perfect coordination is difficult to obtain.

An object of the present invention is to provide an automatic plural step-ratio transmission in which parts can be connected to rotate in unison with the inertias of acceleration and deceleration substantially balanced.

Another object of the invention is to provide a transmission for transmitting torque from a prime mover to an output member which transmission is so proportioned and the parts thereof of such predetermined masses that the usual flywheel associated with the prime mover can be reduced considerably in mass, with a consequent reduction in the moment of inertia thereof, whereby this inertia and other inertia accelerated or decelerated therewith can be balanced by an inertia associated with a part of a gear unit embodied in the transmission.

Another object of the invention is to provide a transmission in which a first gear unit has an element thereof driven by the engine, which engine has the inertia thereof materially reduced, and in which another element of the gear unit has associated therewith a mass of inertia bearing a predetermined relation to the engine inertia.

Another object of the invention is to provide an arrangement as just described in which the gear unit operates automatically whenever the engine is running, particularly at idling speed, to cause the inertia associated with an element of the unit to be added to that of the engine for smoothing out engine impulses.

Another object of the invention is to provide a transmission having at least two gear units with control mechanism therefor of such character that a change in the condition of the two units can be made by the application of a single friction engaging element in coordination with the release of another friction engaging element.

A further object of the invention is to provide a transmission as just described in which the ratio in the two gear elements can be changed simultaneously by the engagement of a single clutch in timed relation to the release of a single brake.

A further object of the invention is to provide a multi-step ratio transmission in which the changes in speed or the gear ratio therein are under the control of a single automatic shift valve which can be operated to establish a plurality of gear ratios in the transmission.

An additional object of the invention is to provide an automatic shift valve which is under the joint control of opposed governor pressure, varying with the output shaft speed of the transmission, and throttle valve pressure varying with throttle opening.

A further object of the invention is to provide a transmission in which the ratio of the gear units is determined by throttle valve pressure opposed to governor pressure, with the transmission being capable of shifting from a high speed ratio to a second lower speed ratio with the momentary establishment of an intermediate ratio between the higher and the second lower ratios.

A further object of the invention is to provide a governor for an automatic transmission of such type that the pressure developed thereby due to output shaft speed varies in three stages.

In carrying out the foregoing and other objects of the invention a transmission has been provided for a prime mover, such as an internal combustion engine, which has a flywheel of considerably reduced mass and inertia. The transmission comprises a first planetary unit which has an element, such as the carrier thereof, driven directly by the engine.

The driven element of the unit, such as the ring gear, is connected to drive the pump of a fluid coupling while the reaction element thereof has secured thereto for rotation therewith a mass having a considerable moment of inertia. The turbine of the fluid coupling is connected to drive a sun gear of a second planetary unit which has a reaction sun gear and which has short and long pinions mounted for rotation on a carrier which in turn is connected to the output shaft of the transmission. In addition the second unit has a ring gear which in forward drive is permitted to idle, but which can be locked against rotation in either direction whereby release of the reaction sun gear and drive of the drive sun gear through the short and long pinions will cause reverse rotation of the carrier and the output shaft.

In order that various speed ratios can be established in the transmission, and at the same time that smooth engine idling can be obtained, the invention makes use of the masses attached to the reaction gear of the first unit for augmenting the engine inertia for idling, and also for affording the mutual reaction in the first unit necessary for the initiation and sustaining of torque transmission thereby. This transmission makes use of a brake which can be applied to lock the reaction sun gear of the second unit against rotation and a friction engaging element such as a clutch which can be applied to lock the reaction element of the first unit to the reaction element of the second unit. In this fashion a single brake can serve to hold reaction elements of the two units against rotation. In addition a further clutch is employed to lock the driven element of the first unit to the reaction sun gear of the second unit whereby the transmission of torque through the mechanism is in two paths, one directly driven by the engine through the locked-up front planetary unit and the other through the fluid coupling driven by the driven element of the front unit. In addition a separate brake can be employed for locking the reaction element of the first unit against rotation so that geared drive through this unit can be obtained, preferably for the highest speed ratio of the transmission.

Controls for this transmission are of the clutch and brake type with selected actuation thereof for establishing sequential speed ratios by properly conditioning the two gear elements. Successively higher speed ratios are established automatically by a single shift valve controlling the passage of liquid under pressure to the friction engaging devices of the units. The shift valve has throttle valve pressure, which varies with throttle opening, applied in one direction thereto, and has governor pressure, which varies with output shaft speed, applied thereto in the opposite direction. That part of the shift valve mechanism subject to governor pressure is of composite form whereby initially a large area is presented to governor pressure, with successively smaller areas presented thereto to cause movement of the shift valve in steps. In addition the shift valve train makes use of manually selected movable plugs for limiting the advancement of the transmission from a lower speed ratio to a higher speed ratio to certain limits under normal driving conditions.

Other features, objects and advantages of the invention will become apparent by reference to the following detailed description of the accompanying drawings therein.

Figure 4:
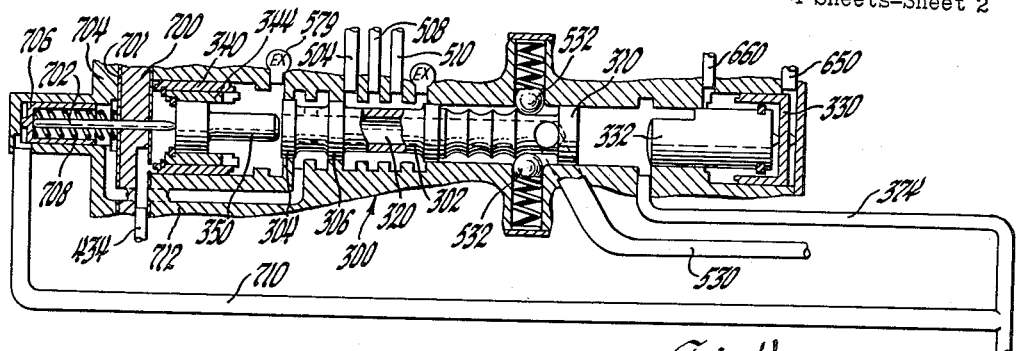
Figure 4A:
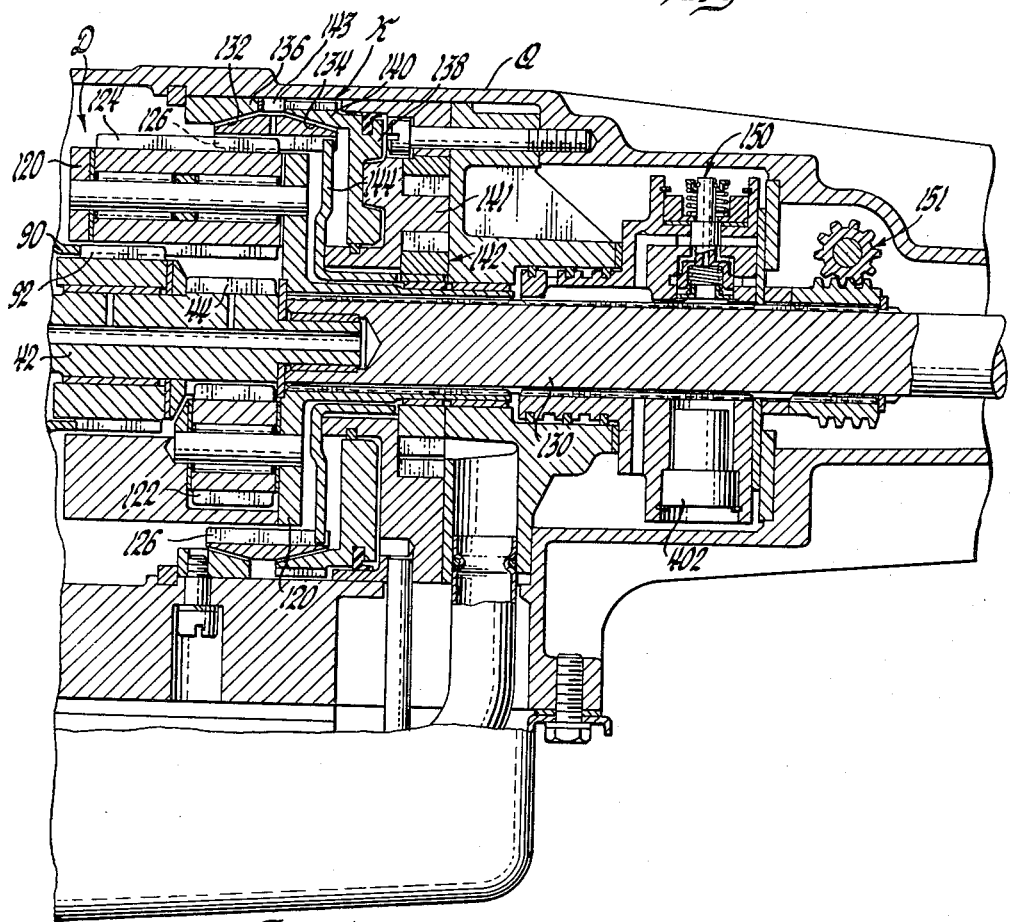

FIGS. 1 and 1A together illustrate the mechanical parts of the transmission,

FIGS. 2 and 2A together constitute a schematic representation of the hydraulic controls for the mechanism, FIG. 3 is a chart showing the manner in which governor pressure varies in three stages, and FIG. 4 is a schematic representation of a modified shift valve train.

Referring to the drawings, and particularly to FIGS. 1 and 1A, the transmission, which is contained within a casing A, comprises a front planetary unit B, a fluid coupling C, and a rear planetary unit D. Associated with these planetary gear units are a second gear clutch E, a rear unit clutch F, a band brake G, a brake H, and a reverse brake K.

In more detail, the mechanism comprises an input shaft 10, which may be the crankshaft of an internal combustion engine, the casing 11 of which has the transmission casing A secured thereto. The input or crankshaft 10 has connected thereto a disk-like member 12, to the periphery of which are secured the teeth 14 of a starting gear. The disk 12 replaces to some degree the conventional flywheel of an internal combustion engine, but is made of considerably lighter weight than is the common practice. Secured to the disk 12 near the periphery thereof is a drum-like member 16 connected to a vibration reducing device 18 and through it to the planet carrier 20 of the front planetary gear unit B. Planet carrier 20 has rotatably mounted thereon planet gears 22 meshing with a ring gear 24 and a sun gear 26. Ring gear 24 is fastened directly to the shroud 28 of the pump of fluid coupling C. This shroud has a plurality of blades 30 mounted therein. The shroud is extended and connected to the periphery of a cooperating member 32, the central portion of which is indented as indicated at 34 to telescope within the hollowed out end of the input shaft 10. The shroud of the turbine 36 of fluid coupling C is attached to a flange member 38, the hub 40 of which is splined to engage splines on an intermediate shaft 42. This shaft 42 extends to the right from the coupling and has near the end thereof sun gear 44 of the rear planetary unit D. Shroud 36 has a plurality of blades 37 mounted therein. One-way clutch elements 25 between the sun gear 26 and carrier 20 prevents the sun gear from rotating faster than the carrier in the forward direction.

The sun gear 26 of the front planetary unit has attached thereto a member 46, to the outer end of which is secured an annular weight 48. The member 46 is provided with a plurality of spaced openings through which extend fingers 50 of stamping 52. Snap ring 54, seated in grooves in the fingers 50, retains the stamping in assembly with the member 26. This stamping, as shown in the drawing, extends axially, then radially inwardly as at 56, and again axially as at 58. The stamping 52 has a plurality of axially extending slots therein to receive the splined peripheries of a plurality of clutch plates 60. Also passing through the slots are radial fingers of a spring washer 62, the outer edge of which bears against member 46. The other plates 64 of clutch E are internally splined to fit in slots in a tubular member 66 which is concentric with the intermediate shaft 42. A piston 68, mounted in a cylinder formed in part by the stamping 52 and in part by a tubular extension 70 of the member 72, can be hydraulically actuated to move the plates 60 and 64 into engagement, causing simultaneous rotation of the tubular member 66 with the member 46, and hence the sun gear 26. Member 72 is in the form of a casting secured to the casing A in such fashion as to be stationary. This casting 72, in cooperation with a further casting 74, provides a pump chamber in which is mounted the front pressure pump 76, the rotor of which is driven by the axial part 58 of the stamping 52. This pump may be of any well-known gear type, or may be of any other type suitable for supplying hydraulic pressure for the operation of the mechanism.

The casting 74, which is of irregular shape, has a disk 78 secured to the axially extending outer part thereof, such disk 78 serving as a backing member for the brake H. The other components of brake H comprise a disk 80 splined to the slots in the stamping 52, and a piston 82 mounted in a cylinder formed in the casting 74. This piston 82 can be moved by hydraulic pressure to cause the plate 80 to be locked against disk 78, thereby to lock the stamping 52, and consequently sun gear 26, to the casing against rotation in either direction. A wave spring 83 biases piston 82 to released position of the brake.

Tubular member 66 has a radially extending flange 84 connected to an axially extending drum portion 86. This drum portion 86 in turn is secured to a drum 88 which has a radial part 90, the inner terminal of which is secured to the reaction sun gear 92 of the rear planetary unit D. The drum part 86 is axially slotted to receive splined clutch plates 94 of the rear unit clutch F. The other plates 96 of this clutch are splined to slots in a sleeve shaft 98, the left end of which has a flange 100 riveted or otherwise secured to the inner extension of the shroud of pump 28 of fluid coupling C. The plates 94 and 96 can be forced together against the radial part 90 by means of a piston 102 which has axially extending fingers 104 passing through openings in the radially extending disk part 84. Piston 102 is normally biased to the left by springs 106 bearing against the disk 84 and seated in recesses in the piston. The piston is mounted for movement in a cylinder formed in part by an axial extension 73 of casting 72 and a stamping 108 which has a drum-like part 110 secured to the drum 88 by a snap ring 112.

The drum 88 and parts connected thereto or connectible thereto can be held against rotation in either direction by a brake band 114 wrapped about the drum 88. The wrapping of this band about the drum can be carried out by a well-known type of servo mechanism, some details of which will be shown in connection with the schematic hydraulic controls of the transmission.

The rear planetary unit D, in addition to the sun gear 44 and the reaction sun gear 92, comprises a carrier 120 having rotatably mounted thereon a plurality of short planet pinions 122 meshing with sun gear 44, and also a plurality of long planet pinions 124 meshing with the reaction sun gear 92, the short pinions 122, and a ring gear 126. The planet carrier 120 is splined to the output shaft 130.

The ring gear 126, which can be locked against rotation for reverse drive through the planeary unit, has the periphery thereof so shaped as to provide diverging conical surfaces 132 and 134. The surface 132 normally is adjacent to a conical shaped member 136 secured to the casing A. A piston 138 has an extension of conical shape as at 140 conforming to the shape of the surface 134 of the ring gear. Piston 138 is slidably mounted in a cylinder formed in a casting 141 secured to the casing. A wave spring 143 biases piston 138 to the right. Casting 141 also provides a cavity for a rear pump 142 of gear or other suitable type, the rotor of which is driven by the disk 144 which is splined to the reverse reaction ring gear 126. The ring gear 126 is supported in part by the disk 144 which has a hub part concentric with the hub of the carrier 120 and which is slotted for a driving connection to the rotor of pump 142. This arrangement causes pump 142 to be driven at overdrive in first and second speed ratios of the transmission and to be held inactive during reverse drive as will be explained in more detail later.

Driven by output shaft 130 is a hydraulic governor, indicated generally at 150, which will be described in detail later in conjunction with the operation of the system and a speedometer drive arrangement 151 of well known type.

Briefly, the operation of the two planetary units for the various speed ratios of the transmission is as follows. For first speed ratio the brake G is engaged by wrapping the band 114 about the drum 88. This locks the reaction sun gear 92 of rear unit D against rotation in either direction. Rotation of input shaft 10 causes rotation of the carrier 20 of the front planetary unit B, and since the sun and ring gears of this unit must afford mutual reaction, the result is that finally, with greater reaction offered by the ring gear due to the coupling C, the sun gear is driven with a force which would cause it to overrun the carrier if such action were not prevented by the one-way clutch elements 25. With the sun gear prevented from rotating faster than the carrier it rotates at the same speed as the carrier, thereby in effect locking the front unit so that the ring gear 24 likewise rotates at the same speed as the other two elements. Rotation of the ring gear 24 causes rotation of pump 28 of the fluid coupling C, and if the speed of rotation of the pump is high enough, the turbine 36 is compelled to rotate by the circulation of oil in the coupling. The front unit B, under these conditions, is in direct drive so that the turbine 36 is driven substantially at engine speed. Rotation of turbine 36 causes rotation of the sun gear 44 of the rear unit which meshes with the short pinions 122, in turn meshing with the long pinions 124. These long pinions are in mesh with the reaction sun gear 92 so that the long pinions are compelled to walk around this reaction sun gear, carrying the carrier 120 therewith and also causing a similar rotation of the output shaft 130. In this ratio the transmission has a reduction ratio dependent solely upon that of the rear unit D.

To obtain second speed ratio the clutch E is engaged, which locks the sun gear 26 against rotation since the engagement of clutch E locks the stamping 52 to the tubular member 66, which member in turn is held against rotation by the applied brake G. With the sun gear 26 held against rotation, continued drive of the carrier 20 causes the ring gear 24 to be rotated at an overdrive ratio determined by the ratio of the front unit. The coupling C is compelled to rotate at a faster rate than the engine, and such rate of rotation is imparted to the rear unit D in the manner previously described. The condition of the rear unit is unchanged in second speed ratio so that the output shaft 130 is driven at a reduction ratio which is the result of the reduction ratio of rear unit D and the overdrive ratio of the front unit B.

For third gear ratio the clutch F is engaged. Engagement of this clutch locks together the sun gear 26 and the ring gear 24 so that the front unit B again is in direct drive. In timed relation with the application of clutch F, release of the brake G is carried out so that the reaction sun gear 92, instead of being held against rotation is compelled to rotate at the speed of rotation of the locked-up front unit B. The sun gear 44 of the rear unit is driven at substantially the same rate as the reaction sun gear 92 under these conditions (the difference in speed being due entirely to the slip in coupling C), so that the rear unit D is for all practical purposes likewise locked up. The output shaft in third speed ratio is driven at substantially the same speed as the input shaft 10.

For fourth gear ratio the clutch E is released before application of the brake H, causing direct drive in the front gear unit to be maintained by the free wheel unit 25. Upon completion of application of brake H the sun gear 26 again is locked against any rotation so that the front unit is operating in overdrive ratio. The condition of the rear unit remains unchanged, i.e., the reaction sun gear 92 is driven at the same speed as ring gear 24, and the sun gear 44 of the rear unit is driven at the same speed as the turbine of the coupling C. Output shaft 130 therefore rotates faster than the input shaft to a degree determined solely by the overdrive ratio of the front unit.

The above explanation is simply to point out the conditions existing in the gear sets for the various forward speed ratios and it is to be understood that a more detailed explanation of the relation of various inertias involved will be set forth hereinafter.

For reverse, the clutches E and F and the brakes G and H are released while the reverse brake K is applied. Such application is accomplished by movement of piston 138 to the left under hydraulic pressure, which brings the conical surface 140 of the piston into contact with the conical surface 134 of the ring gear structure, and continued movement of the piston with the ring gear forces the conical surface 132 against the fixed or stationary conical surface 136. In this manner rotation of the ring gear 126 is prevented. The front unit operates in direct drive, causing the sun gear 44 of the rear unit D to be rotated in the same direction as that of the input shaft 10. Since the ring gear 126 is held against rotation, the long pinions 124, actuated by the short pinions 122, driven by sun gear 44, must walk around the ring gear 126 in the reverse direction, compelling the carrier 120 and the output shaft 130 also to rotate in reverse direction.

In order that changes in gear ratio can be made with a minimum of shock or jerk which can be felt by the operator or occupants of the vehicle, certain relations between parts have been carried out. Inasmuch as most of the objectionable jerk or shock encountered in the changing of gear ratio conditions is due to the locking together of parts having unbalanced inertias, the present invention provides arrangements whereby such objectionable action can be prevented or minimized. To this end the inertia associated with the flywheel and the like of an engine has been reduced to a considerable degree by constructing the disk 12 and the parts connected thereto of relatively light weight or light gauge material. The reduction in weight however must be kept within limits and must be kept within an inertia ratio which can be balanced in part by the inertia of the annulus 48 which is connected to the sun gear 26 of the front planetary unit. Likewise the fluid coupling C is so constructed as to possess a predetermined inertia which in some instances is added to the inertia of the engine driven parts for balancing purposes. The particular relation between the inertia of the engine driven parts, the inertia of the fluid coupling and the inertia of the reaction member 48 will be pointed out in connection with the change in gear ratio wherein the balancing of inertias, some being accelerated and some being decelerated, is of the major importance.

Inasmuch as the flywheel or engine driven members have been reduced in inertia effects, the present arrangement of the front gear unit makes possible the provision of such a combination of inertias as to provide a flywheel effect sufficient to promote smooth engine idling even at low speed.

First, consider the action that takes place with the transmission in neutral and with the engine idling. In neutral, the clutches E and F and the brakes G, H, and K are all released so that reaction in the rear unit D is entirely omitted, and hence torque to compel rotation of the carrier 120 and the output shaft 130 cannot be transmitted to this carrier. Assuming that liquid is present in the fluid coupling C, it follows that as soon as the engine begins rotating the disk 12, the member 16 attached thereto and the carrier 20 of the front planetary unit B, the presence of liquid in the coupling will offer resistance to rotation of the pump 28 of the coupling C, which pump is fastened to the ring gear 24. The ring gear therefore offers sufficient reaction to cause the sun gear 26 to be rotated in the same direction as the carrier 20. If unimpeded, the sun gear would rotate faster than the carrier, but such action is prevented by the one-way clutch 25. Consequently, the sun gear rotates at the same speed as the carrier and of necessity the ring gear 24 will also rotate at this same speed. Under these conditions the engine inertia, the coupling inertia, and the reaction inertia represented by the annulus 48 are rotating in unison, with the total inertias being large enough to amount to that which is normally employed in the flywheel of an internal combustion engine for smoothing out the impulses due to combustion of the fuel in the engine cylinders at spaced intervals.

Rotation of the sun gear 26 causes rotation of the rotor of the front pump 76 which draws oil from the transmission sump and supplies it to the coupling and to lubrication channels in the transmission and also to the control mechanism therefor. Should by any chance the coupling C be entirely empty of oil when the engine is started, it might not at low engine speed offer sufficient resistance to rotation as to provide the reaction necessary for the attached ring gear 24 to cause rotation of the sun gear 26. Since the reaction inertia annulus 48 has a considerable moment of inertia, theoretically it might be possible for the sun gear 26, attached to this annulus, to provide reaction of such nature as to compel the ring gear 24 to be rotated forwardly at overdrive ratio. Should the sun gear be stationary, under these conditions the front pump 76 would be idle and oil would not be pumped immediately to fill the coupling C. However, in actual operation the overdrive of the ring gear 24, and hence of the pump 28 of coupling C, will be at such speed that the air in the coupling will offer considerable resistance to coupling pump rotation. This resistance is increased as the engine speed is increased until the resistance to rotation of the pump coupling will afford the reaction necessary to cause rotation of the sun gear 26, which will in turn drive the front pump 76 to supply oil to the coupling, filling the same and causing it to offer its normal resistance to coupling pump rotation.

Supply of oil to the coupling C and from it to the transmission for lubrication purposes is assured in neutral by the drive arrangement for the rear pump 142. As before pointed out, this pump is driven by the reverse reaction ring gear 126 through the agency of the member 144. Consequently, if the sun gear 26 of the front unit and parts which must rotate therewith offer sufficient reaction, due to increased friction or the like, the overdrive of the pump 28 of coupling C will cause drive of the turbine 36, the intermediate shaft 42 connected thereto, and the driving sun gear 44 of the rear planetary unit. Such transmission of torque will occur with a small amount of oil in the coupling or due to the resistance of air in the coupling.

In neutral, reaction in the rear unit is afforded by the planet carrier 120 secured to the output shaft 130 which will be connected to drive the vehicle wheels and hence has a load thereon. With reaction afforded by the carrier 120 it follows that rotation of the sun gear 44 in the forward direction causes such rotation of the short pinions 122 and the long pinions 124 as to drive the ring gear 126 forwardly at an overdrive ratio. This overdrive ratio of the ring gear is imparted to the rear pump 142 which immediately will supply oil to the entire hydraulic system. It follows, therefore, that due to the mutual reaction provided by the sun gear 26 and the ring gear 24 of the front planetary unit, operation of either the front pump 76 or the rear pump 142 is assured.

Since the drive to the front unit B is by way of the planet carrier, it follows that the ring gear and sun gear of this unit must afford mutual reaction, one to the other, for obtaining drive through this unit. The mass of the annulus 48 therefore has been determined in relation to the size of the retaining casing A, the moment of inertia of the engine driven disk and attached parts and the moment of inertia of the fluid coupling, particularly the shroud attached to ring gear 24. The exact relation between the inertia of these parts is determined primarily by considerations involving the ratio of the rear unit D and the effect thereof upon the acceleration and deceleration of certain elements associated therewith. As an example, let it be considered that the reduction ratio of the rear unit D is 2.62. The overdrive ratio of the front unit B is 1.55. The inertia of the parts driven by the engine may be given the symbol IE, the inertia of the fluid coupling IC, and the inertia of the reaction annulus 48, and parts rotating therewith, IR. Since one change in ratio condition of the transmission wherein balanced inertias are desirable takes place in a shift or transition from second speed ratio to third speed ratio, let us first consider the condition that will exist when the transmission is operating in second speed ratio. Assume that the output shaft 130 is rotating at 1000 r.p.m. In second speed ratio the front unit B is operating in overdrive since the clutch E being engaged connects the sun gear 26 to the drum 88 which is held against rotation by the brake band 114 of brake G. The rear unit D is conditioned for reduction drive. Consequently, with an output shaft speed of 1000 r.p.m. the coupling C will be rotating at 2620 r.p.m. due to the reduction ratio of 2.62 in the rear unit D. The overall ratio of reduction between the engine and the output shaft however is 1.69. Consequently, the engine will be rotating at 1690 r.p.m. The reaction annulus 48 is stationary due to the engagement of clutch E previously mentioned. If the transmission is operated to condition the gear units for third speed drive, which is direct drive, the engine must be decelerated from 1690 to 1000 r.p.m. The coupling C must be decelerated from 2620 r.p.m. to 1000 r.p.m. while the reaction annulus 48 must be accelerated from 0 to 1000 r.p.m. Thus if the inertias being decelerated on the one hand are to be balanced by the inertia being accelerated on the other hand, the inertias of the various moving parts must be closely calibrated.

From the foregoing example it will be seen that the inertia of the engine, or IE, is being decelerated 690 r.p.m. The inertia of the fluid coupling, or IC, is being decelerated 1620 r.p.m. The inertia of the reaction annulus 48, or IR, is being accelerated 1000 r.p.m. Consequently, for an inertia balance to exist the parts must be so proportioned that $$1000 \ IR = 690 \ IE + 1620 \ IC$$

or simplified $$IR = .690 \ IE + 1.620 \ IC$$

Once IE and IC have been determined, IR can be determined and the annulus 48 made of such mass that it, and parts rotating therewith, provide the necessary inertia.

With the balance of inertias thus determined, it follows that as the clutch F is engaged and brake G released, the inertia annulus 48 is accelerated from rest to a forward rotation attaining 1000 r.p.m. Simultaneously, both the engine and the fluid coupling are being decelerated, that is the speeds of their forward rotations are being reduced until they likewise attain a speed of 1000 r.p.m. Consequently, the clutch F can be applied to cause the progressive deceleration and acceleration, with a final complete locking together of the parts without imparting shock or jerk to the transmssion of a nature which can be noticed in the drive train.

Balancing of inertias of acceleration and deceleration will also occur on a shift from third speed ratio to second speed ratio. Again assuming that the output shaft speed is 1000 r.p.m. while the transmission is operating in third speed ratio, a change from third speed ratio to second speed ratio will require an acceleration of the engine from 1000 r.p.m. to 1690 r.p.m.; and acceleration of the coupling from 1000 r.p.m. to 2620 r.p.m. and a deceleration of the annulus 48 and the parts rotating therewith from 1000 r.p.m. to 0. With the parts possessing the inertias previously described, it will be seen that the inertias of parts being accelerated are balanced by the inertias of the parts being decelerated. The deceleration is necessary since in second speed ratio the sun gear 26 must be held against rotation. Therefore, if the clutch F is released, the immediate effect will be a reaction which will tend to drive the sun gear 26 in the reverse direction which drive will cause a deceleration from output shaft speed to 0 and if the sun gear is not locked at that time, it would be compelled to rotate in the reverse direction. The system is designed to permit release of clutch F in timed relation to re-engagement of the brake G so that this brake can be applied as the interval of deceleration approaches a point at which the sun gear 26 would be stopped so that the brake G can be applied without causing such abrupt stopping of the sun gear 26 as would cause shock to the transmission. Another advantage of the balanced inertia is obtained due to the fact that as the sun gear inertia is decelerated it offers reaction whereby the acceleration of the engine and the coupling is accomplished with maintenance of torque transmission through the transmission. In this fashion most of the energy created by the acceleration of the engine is utilized in driving the vehicle, with only a small percentage thereof expended in acceleration of engine inertia. The tendency for engine run-away is therefore obviated.

While engine speed has been described as being of the order of 1690 r.p.m. when the transmission is in second speed ratio and as 1000 r.p.m. when the transmission is in third speed ratio, it will be understood that these figures are not exact since engine speed will probably be in excess of the given figures due to the inherent slipping in the coupling C.

Other advantages of the reaction annulus possessing considerable inertia will be set forth in the description of the operation of the mechanism in conjunction with the hydraulic equipment associated therewith. This hydraulic equipment is shown schematically in FIGS. 2 and 2A.

In these figures the front pump 76 and the rear pump 142 are shown diagrammatically with their inputs 77 and 143 respectively connected to the oil sump to draw oil therefrom. Oil delivered by the front pump 76 passes through line 200 to the double arm check valve 202 and this oil can flex the left arm 204 whereupon the oil can continue through line 206 to the pressure regulator valve indicated generally at 210. The operation of this valve will be described later. The rear pump 142 discharges oil into line 212 which extends to the check valve 202 and can flex the right arm 214 thereof so that the oil in line 212 can continue through line 206 to the pressure regulator valve 210.

The pressure of the oil as regulated by the regulator valve 210 depends on the position of a manual control valve indicated generally at 220. The body of this valve has a bore in which is slidably mounted a valve member 222 having lands 224, 226 and 228. The stem of the valve 220 between lands 226 and 228 is provided with a plurality of peripheral grooves 230, 232, 234, 236 and 238. These grooves can be engaged selectively by oppositely disposed balls 240 spring pressed toward the stem by springs 242. The right end of the valve member 220 is connected to a rod 244 which can be joined by suitable linkage to a manually controlled lever for manipulation by the operator of the vehicle. The bore of this valve 220 is also provided with a plurality of ports which will be identified later in connection with the lines connected to the port.

The pressure regulator valve 210 before mentioned comprises a valve member 250 slidable in a bore in a valve body and provided with a terminal portion 252 and lands 254, 256, and 258. The valve member 250 is normally biased to the right by spring 260. The bore of this valve is provided with a plurality of ports, one of which is connected to the inlet line 206 and another of which is connected in diametric disposition to line 262. This line extends to a port in the bore of the control valve 220. Line 262 also has a branch line 264 communicating with the bore of the regulator valve to the right of the terminal part 252 thereof. Assuming that the manual valve 220 has been placed in its neutral position which is the position ordinarily employed when the engine is started and being permitted to warm up, it will be seen that the balls 240 are engaged with the groove 232. Movement of the manual valve to this position causes the land 224 to be moved to the right sufficiently to block passage of oil to line 520 which extends to the reverse brake K. Land 226 opens a port connected to line 270 so that oil from line 262 can pass through line 270 and through restriction 272 to act on the right end surface of land 254 of the regulator valve 210. Assuming further that the engine has been started the front planetary unit B will be operated in direct drive condition in the manner described in connection with first speed operation but since reaction is not provided for the rear planetary unit D, torque is not transmitted through the transmission. The front pump 76, however, will be driven and will deliver oil to the check valve 202 and from it through line 206 to the bore of the regulator valve between lands 256 and 258. This oil can then continue through line 262, the bore of the manual valve 220 and through line 270 and restriction 272 to the land 254 of the regulator valve. At the same time oil is being supplied through the branch line 264 to the right end of the terminal part 252 of this regulator valve. As the pressure delivered by the pump 76 increases the oil supplied to the terminal part 252 and to the land 254 will move the valve member 250 to the left against spring 260. The initial movement in this fashion will uncover a port connected to line 274 which extends to the fluid coupling C to fill the same. Inasmuch as oil is being supplied continuously to the fluid coupling and since heat is generated by circulation of oil in the coupling, the pressure of the working circuit therein must be maintained and oil must be continually circulated into and out of the coupling. The pressure of the working circuit in the coupling is determined by a restriction 276 in the outlet line 278 of the coupling which outlet line 278 feeds a plurality of lubrication channels 280, with any excess oil being permitted to be exhausted through the smaller restriction 282. If the pressure in the regulator valve outlet line 262 exceeds a predetermined maximum this pressure being directed to the terminal part 252 and land 254 will move the valve member 250 to the left against spring 260 far enough to permit land 256 to establish communication between the port connected to line 206 and a port connected to line 284 which extends to the sump from which oil is drawn by the two pumps 76 and 142. In neutral position the regulator valve 210 operates to regulate the delivered pressure from front pump 76 to a maximum, determined by spring 260 and throttle valve pressure as will be explained later.

The transmission makes use of an automatic shift valve indicated generally at 300. This valve has a bore in which is slidably mounted a valve member 302 having spaced lands 304, 306, 308, and 310. The expanse of the valve between lands 308 and 310 is provided with a plurality of peripheral grooves 312, 314, 316, and 318. The valve 302 is provided with a hollow bore indicated at 320 formed by drilling from the left end of the valve almost completely throughout the length thereof with this bore terminating approximately at the land 310. After the bore has been drilled the left end thereof is closed by a plug 322. This bore in the valve has in communication therewith radial or diametric openings 324 and 326 between lands 304 and 306, and between lands 308 and 310 respectively.

Associated with the valve 302 is a ratio selector combination comprising a cup member 330 slidably mounted in an enlarged part of the bore and a plug member 332 telescoped within the cup 330 and slidable in the same bore as the valve member 302. The plug 332 has a snap ring 334 fitting in a groove around the plug and has a flat 336 for purposes to be described later.

Also associated with the valve member 302 is a governor plug assembly comprising an outer cylinder 340 having a snap ring 342 fitting in an internal groove, a second cylinder 344 having a snap ring 346 fitting in an internal groove, and finally a plug 348 having a stem 350 extending into contact with the left end of land 304 of valve 302. As will be seen in the drawing the cylinder 340 is slidable in an enlarged part of the bore of this shift valve train and can move to the right until the end thereof is arrested by the stop 352. The cylinder 344 is slidable within the cylinder 340 and can move to the right until the end thereof is arrested by the stop 354. The plug 348 is slidable within the cylinder 344 and can move to the right unrestricted except by the valve 302. The snap rings 342 and 346 compel various parts to move in unison. The bore of this shift valve train is provided with a plurality of ports connected to various oil lines the function of which will be described in connection with the detailed description of the operation of the mechanism.

Whenever either of the pumps 76 or 142 are supplying oil through the regulator valve 210 to the line 262 some of the oil passes through the branch line 263 to the throttle valve regulator indicated generally at 360. The bore of this throttle valve regulator has a part of one diameter in which is slidably mounted a part of the regulator comprising a valve member 362 having spaced lands 364 and 366. Another part of the bore of this valve is of larger diameter and has slidable therein a cup shaped member 368 in which is nested spring 370 the other end of which bears against the right end of land 366. The cup shaped member 368 can be moved to the left to compress spring 370 by an arm 372 connected by suitable linkage, not shown, to the throttle of the engine for the vehicle. As the engine throttle is opened the arm 372 moves the cup member 368 to the left compressing spring 370. Such compression of spring 370 forces the valve member 362 also to the left causing land 364 to open the port connected to line 263 whereupon oil can continue from the bore of the valve through the line 374 to the bore of the shift valve 300 between the right end of land 310 and the left end of the plug 332. A branch line 376 from line 374 extends to the bore of the pressure regulator valve 210 to the left of the land 258 at which location it can act in cooperation with spring 260 to oppose movement of the regulator valve to the left. A branch line 375 from line 374 extends to the left end of the land 364 of the throttle valve regulator 360 for the purpose of moving this valve member to the right when the delivered pressure of the regulator valve 360 exceeds the resistance offered by spring 370. When such condition occurs the valve 362 is moved to the right first closing the port connected to line 263 and next causing the land 366 to open a port connected to the exhaust opening 367. Due to this regulating action, which is well known in the art, the pressure developed by the throttle valve regulator 360 increases in proportion to throttle opening varying, for example, from 22 p.s.i. at zero or closed throttle to 75 p.s.i. at full throttle. The uses to which this varying pressure are put will be explained later.

When the output shaft of the transmission is rotating, the governor 150 is caused to revolve to develop a varying pressure which increases with increase in the speed of rotation of the transmission output shaft 130. The governor 150 comprises a body 400 rotated by output shaft 130 and having a radially extending bore in which a regulator valve is mounted and also an oppositely disposed counterbalance 402 (FIG. 1A). The regulating valve which revolves as the body 400 is rotated comprises a valve member 410 having spaced lands 412 and 414 the latter of which is of stepped diameters. The bore in which this valve slides is of proper diameter to receive the lands 412 and 414. Land 414 is hollowed out to receive a spring 416 the inner end of which rests against an abutment 418. In conjunction with the valve 410 use is made of an annular weight 420 orificed for the passage of the stem 422 extending from the land 412. The weight 420 is slidable in an enlarged part of the bore between a shoulder 424 and a snap ring 426 fitting in an internal groove in the bore. Spring 428 has one end seated against weight 420 and the other end against a collar 430 fitting on the stem 422 and retained in place by spring ring 432.

When the rear pump 142 is operating, i.e., whenever the transmission is in neutral or in one of the forward speed ratios, oil from this rear pump is supplied by the branch line 213 from line 212 to a port in the bore of the governor valve, which port is opened by the spring 416, when the governor is not being rotated, forcing the valve 410 outwardly. With the land 412 moving outwardly, oil can continue from line 213 through the bore of the governor valve and out through line 434 to parts of the mechanism. As soon as the pressure developed in line 434 exceeds the pressure supplied by the spring 416, the hydraulic pressure acting on the area of land 414 in excess of the area of land 412 moves the member 410 inwardly, first closing the port connected to line 213 and next opening the port connected to exhaust passage 436. In this the first stage of operation by the governor, the governor pressure developed by the governor valve rises at a fairly rapid rate as indicated by the curve extending from zero to point X on the chart comprising FIGURE 3 of the drawing. This pressure rise is determined solely by rise of rear pump pressure due to increase in its speed of operation.

As the governor valve is rotated by rotation of the output shaft 130, the pressure developed in line 434 increases at a rate which is determined by the effect of centrifugal force on the mass of the valve 410 and on the weight 420, which centrifugal force is augmented by the pressure of spring 416. Thus as the governor valve body rotates and the valve 410 revolves about output shaft 130, these forces moving the valve member outwardly determine the hydraulic pressure which is required to move the valve member inwardly to close the inlet port and then open the exhaust port. It will be understood that in all stages of governor operation the valve member reciprocates through a relatively short range of movement from a position opening the inlet port to a position opening the exhaust port. The centrifugal force exerted on the weight 420 is communicated to the valve member 410 by the spring 428 which is progressively contracted as the weight 420 moves outwardly. During the second stage of regulation by the governor valve the metered pressure developed thereby increases from the point X to the point Y on the chart of FIGURE 3. At the end of this stage, the weight 420 will be at its outermost position against the snap ring 426.

In the third stage of regulation of governor pressure the weight 420, being held against further movement outwardly, exerts a constant force on the member 410 through the spring 428. As the speed of rotation of the output shaft increases during the third stage, the regulated pressure increase will be due to the constant force exerted by the weight 420, the constant force exerted by the spring 416 and centrifugal force on the entire body of the member 410. The pressure therefore in the third stage rises at a different rate than in stages one and two. This third stage extends from the point Y of FIG. 3 at a progressive rate as indicated by the line Y—Z with the result that the pressure developed by the governor will eventually equal pump pressure at a high output shaft speed. The manner in which governor pressure is utilized in connection with the automatic operation of the mechanism will be explained later.

The clutch E of FIG. 1 has been shown diagrammatically and has associated therewith an accumulator 440 comprising a body forming a cylinder in which piston 442 can reciprocate. Piston 442 is biased upwardly by spring 444, but such biasing is opposed by regulated pump pressure supplied by line 265 branched from line 262. Associated with the clutch E and the accumulator 440 are oil supply lines to be described later.

The brake H has also been illustrated diagrammatically and it has associated therewith an accumulator 450 similar to accumulator 440 and having a cylinder in which piston 452 is slidable, such piston being biased upwardly by spring 454. Oil to oppose this biasing force is supplied by branch line 267 from line 265.

The rear unit clutch F has also been illustrated diagrammatically and this clutch has associated therewith for coordinated operation the rear unit servo indicated generally at 460. This servo comprises a body having a cylinder 462 in which is slidably mounted a piston 464. The body also has an annular partition wall 466, against the inner surface of which a part of piston 464 is in sliding contact. The piston 464 has a stem 468 which can extend outwardly from the body to engage a member 470 secured to the brake band 114 whereby movement of piston 464 and stem 468 upwardly as viewed in the drawing causes band 114 to be wrapped about the drum 88. A light spring 472 biases the piston 464 downwardly in the absence of oil either above or below the surface of piston 464.

Also associated with the rear unit clutch F and the servo 460 is a fourth-to-second timing valve 480 which comprises a valve member 482 slidable in a bore and having spaced lands 484 and 486. A spring 488 applies a biasing force to maintain the valve 482 in the position shown. The bore of this valve is provided with ports connected to oil lines which will be identified in the conjunction with the description of the operation of this valve.

The operation of the control mechanism in association with the clutches and brakes of the planetary units will best be understood by reference to the following detailed explanation. It should be noted that the manual control valve 220 has five positions in which the balls 240 engage respectively the grooves 230, 232, 234, 236 and 238. These positions are, in order, reverse or Rev. as indicated on the drawing, neutral or NEU, DRIVE, third or 3rd, and second or 2nd. The positioning of the manual valve for these respective conditions of the transmission is accomplished by successive movement of the stem 244 to the right from the reverse position illustrated to second.

NEUTRAL

With the manual valve in neutral position, i.e., with the groove 232 engaged by the balls 240 and with the engine running, the front planetary unit B automatically operates in direct drive ratio in the manner before described. Drive of the turbine 36 of coupling C causes rotation of the sun gear 44 of rear unit D but, since no reaction is established in the rear unit, torque is not transmitted to the output shaft 130. Lack of reaction in the rear unit D is due to the release of the brake G with consequent release of the reaction sun gear 92. Referring to the fluid circuit diagram (FIGS. 2 and 2A) it will be noted that the rear unit servo 460 has the apply portion of cylinder 462 exhausted by the line 500 which extends to the bore of the manual valve 220 and this bore to the right of land 226 is exhausted through the exhaust port 502. Clutch E is also exhausted by line 504 which extends from this clutch to the bore of the automatic shift valve 300 and with the shift valve in the position illustrated the part of the bore between lands 306 and 308 is connected to exhaust at the port 506. The rear unit clutch F and its connection to the brake release side of piston 464 of the rear unit are exhausted by line 508 which also extends to the bore of the shift valve 300 and to exhaust from this bore at port 506. Likewise the brake H is exhausted by the line 510 similarly extending to the bore of the shift valve 300 so that any oil in this brake H could pass from the bore through the exhaust 506. Consequently all hydraulically operated mechanisms which could condition the gear units are exhausted so that the front planetary unit B is free to operate in direct drive condition. The only action taking place while the manual valve 220 is in the neutral position is the supply of the oil by the front pump 76 to the pressure regulator valve 210 with consequent distribution of oil from this regulator valve to the two accumulators 440 and 450 to the right end of land 254 of the pressure regulator valve 210 by way of lines 262, the bore of the manual valve 220 and line 270; and to the throttle valve regulator 360 with a subsequent supply of oil by that valve to the left end of the pressure regulator valve 210 to augment the action of spring 260. Pressure from the throttle valve regulator is also supplied to the bore of the shift valve 300 between land 310 and plug 332 so that the shift valve 302 is moved to the position illustrated in the drawing.

The reverse brake K is also exhausted by the line 520 which extends to the bore of the manual valve 220. In the neutral position of this manual valve the land 224 is located to the right of the port connected to line 520 so that any oil which might have been supplied to the reverse brake K is exhausted out of the open left end of the bore of manual valve 220.

*Operation in First Speed Ratio*

The transmission will operate initially in first speed ratio whenever the manual valve is positioned in either of the three positions of DRIVE, 3rd and 2nd. The following description therefore will be directed to conditions which exist when the manual valve is positioned in the DRIVE position, i.e., with groove 234 engaged by the balls 240. When drive range is selected the transmission will begin operation in first speed ratio and automatically advance from first speed ratio to second speed ratio, then to third speed ratio, and finally to fourth speed ratio under the joint control of throttle position and speed of the output shaft of the transmission.

When the manual valve is moved to select DRIVE range oil supplied from the regulator valve 210 through the line 262 to the bore of this manual valve can, in addition to further travel described in connection with neutral condition, pass through the line 500 to the cylinder 462 below piston 464. Oil so directed to the rear unit servo 460 moves piston 464 upwardly against the light resistance of spring 472 and causes the band 114 of brake G to be wrapped about the drum 88. This locks drum 88 against rotation in either direction and, since the reaction sun gear 92 is connected to drum 88, the sun gear 92 likewise is locked against rotation in either direction and thereby supplies the reaction necessary for causing the rear unit D to transmit torque from the sun gear 44 to the carrier 120 and thence to the output shaft 130. Such transmission of torque will take place when the engine speed has been increased beyond idling or, in other words, when the engine speed is sufficiently high to cause the coupling C to overcome the slip which takes place therein during engine idling, with a consequent drive of turbine 38 by the pump 28. It will be understood that at low speed such as at idling the speed of pump 28 driven by the front unit B in direct drive ratio is not high enough to cause rotation of turbine 38 which has the load of the vehicle drive wheels connected thereto.

Simultaneously with the direction of oil through the line 500 to the rear unit servo 460, oil is also directed into line 530 which extends to a port in the bore of the shift valve 300 between lands 308 and 310. Oil in the bore at this location can enter the hollowed out shift valve 302 through the diametric passage 326 and continue to the diametric passage 324 to enter the bore of the shift valve between lands 304 and 306 at which location further progress is arrested. Inasmuch as oil is present in the bore of the shift valve between lands 308 and 310 it could act on the balls 532 to compress the springs 534. This action is undesirable and is prevented by a branch 536 from line 530 to the lower surface of the balls 532 and by branch 538 from the bore of the manual valve to the upper surface of the upper ball 532. A condition of balanced hydraulic pressure will therefore exist on each side of the balls so that they are retained in contact with a particular groove of the shift valve 302 by action of the spring 534.

As the speed of rotation of the engine is increased by action of the engine throttle the regulated throttle pressure from valve 360 is increased and this increased pressure is present on the right end of land 310 of the shift valve 300. Forward movement of the vehicle immediately activates the rear pump 142 which can supply oil both to the pressure regulator valve 210 and to the governor 150 which is now being operated by rotation of the output shaft 130. Operation of governor 150 causes the supply of regulated governor pressure through the line 434 to the left end of the governor plug assembly made up of cylinders 340, 344 and the plug 348. The pressure so applied to this assembly increases with vehicle speed, but does not cause movement of the shift valve 302 until the force exerted by this governor pressure on the entire plug assembly is high enough to overcome the throttle valve pressure applied to the right end of land 310, and the resistance of spring loaded balls 532. The transmission therefore can remain in first speed ratio over a range of speeds determined by throttle position and speed of rotation of the transmission output shaft 130.

The spring loaded balls 532 in addition to offering resistance to movement of the shift valve to the right, also serve to assure a snap action in the movement of the shift valve and an accurate positioning of the shift valve relative to oil ports. Furthermore, the resistance furnished by the balls 532 serves to vary the shift points for downshifting of the valve relative to the points for up-shifting thereof. In other words, under similar throttle conditions a lower governor pressure is necessary for a downshift movement of the valve than is required for obtaining an up-shift thereof.

Shift from First to Second

When the speed of the output shaft 130 is high enough to cause the governor 150 to develop a pressure applied to the governor plug assembly high enough to overcome throttle valve pressure on land 310, and the resistance of balls 532, the governor plug assembly will move to the right until the cylinder 340 is arrested by the stop 352. Such movement forces the shift valve 302 to the right until the groove 314 is engaged by the balls 532. When the cylinder 340 is arrested governor pressure is effective only on the end of cylinder 344 and the plug 348 so that considerably higher governor pressure is required for further movement of these two latter parts.

With the shift valve so moved to the right second speed ratio is established by passage of oil from the bore of the shift valve between lands 304 and 306 into the line 504. In the position of the shift valve just described, land 306 uncovers the port connected to line 504. Oil in line 504 passes through restriction 540 and continues to the clutch E to force piston 68 of this clutch to the left locking plates 60 and 64 thereof together. Associated with the clutch E and the accumulator 440 therefor are two check valves the action of which is different for the application and the release of clutch E. As oil is fed to the line 504 some thereof continues through line 542 into chamber 544 behind the ball check valve member 546. This oil forces the ball 546 against its seat blocking further progress of oil to the line 548 connected to line 504. A light spring 550 assists in this seating action. Oil which has passed through the restriction 540 in line 504 also passes into line 552 to unseat ball 554 the unseating of which is opposed only by a light spring 556. With the ball 554 unseated oil can continue through line 558 into the accumulator 440 within the piston 442. The presence of oil thus supplied assists spring 444 in raising the piston 442 against regulated pump pressure supplied by line 265. A passage having a restriction 560 therein connects lines 504 and 558 but this passage is not utilized for any purpose during the application of the clutch E but is utilized during exhaust thereof in a manner to be described later. The supply of oil to the clutch E and to the accumulator 440 through connected but parallel channels causes the accumulator to perform the desirable action of cushioning the final engagement of clutch E, which final engagement will take place only when the pressure applied to piston 68 of clutch E is substantially equal to regulated pump pressure. Such cushioning action by an accumulator is well understood in this art.

Inasmuch as the member 66 having clutch plates 64 splined thereto is connected to the drum 88, it follows that the gradual application of clutch E causes a gradual deceleration of the member 52, having clutch plates 60 splined thereto, with a consequent similar deceleration of sun gear 26 and the reaction annulus 48 connected to the sun gear and to the member 52. The gradual deceleration of the sun gear and the reaction annulus is desirable since the final application of clutch E causes the sun gear 26 and the annulus 48 to be held against rotation in either direction. Thus in this speed ratio the clutch E performs the function of a brake since the application of this clutch locks the sun gear 26 to another part of the transmission which in turn is locked against rotation in either direction.

The action of decelerating the sun gear 26 and the reaction annulus 48 is not a balanced inertia action similar to that previously described in connection with the calculation of the inertia of the various parts but the principal jerk or shock usually occasioned by the abrupt locking of a moving part to a stationary part is substantially reduced and the final locking action, being to the casing of the transmission, does not produce a severe inertia shock.

The arresting of rotation of the sun gear 26 conditions the front planetary unit B for overdrive ratio, with the result that the engine is decelerated as the sun gear likewise is decelerated, so that as the engine again accelerates the transmission of torque through the transmission unit is at a ratio which is the result of an overdrive condition in the front unit B and reduction ratio in the rear unit D. With the particular ratios previously specified for the gear sets the final reduction drive between the engine and the output shaft will be approximately 1.69. Drive in second speed ratio will continue until governor pressure representative of output shaft speed as opposed by throttle valve pressure attains a value which is sufficient for causing the transmission to shift to the next higher speed ratio.

The supply of oil to the clutch E is accompanied by the passage of oil through the branch line 505 from line 504 to the bore of the timing valve 480 between lands 484 and 486 thereof. Further progress of the oil is arrested at this position. Also, part of the oil passing through the restriction 540 can pass through the branch line 507 to the timing valve 480 at which point further progress is arrested by the land 486. The purpose for such branch lines 505 and 507 will be clarified later.

When the transmission is operating in second speed ratio the front pump 76 is deactivated, since this pump is driven only when sun gear 26 is rotating. Consequently, the entire supply of oil for the hydraulic apparatus is provided by the rear pump 142 which has sufficient capacity for that purpose. Deactivation of the front pump 76 reduces the load on the engine materially.

Shift Second to Third

The transmission will shift from second speed ratio to third speed ratio when governor pressure acting on the inner cylinder 344 and plug 348 of the governor plug combination is high enough to overcome throttle valve pressure on the right end of land 310 of shift valve 302 and resistance of balls 532. This higher governor pressure will move the inner cylinder 344 and the plug 348 to the right until further movement of cylinder 344 is arrested by stop 354. At this point the groove 316 of valve 302 will be engaged by the balls 532 and land 306 will be in position opening the port connected to line 508 while land 304 has not moved sufficiently to block the port connected to line 504. Oil can now be supplied to line 508, in addition to line 504, so that the oil in line 508 can continue to and through restriction 570 to the piston 102 of the rear unit clutch F. The restriction 570 reduces the flow to the clutch by way of line 508 so, for proper application of the clutch, provision is made for more rapid supply of oil thereto. This is accomplished by the branch line 571 from line 508 which supplies oil to unseat the ball 572 against the resistance of a weak spring 574. With the ball unseated the oil can pass into the line 576 and thereby by-pass the restriction 570. In addition to oil being supplied to the piston of the rear unit clutch F, oil is also supplied through line 578 to the cylinder 462 of the rear unit servo 460 in the space above the piston 464. The surface of the piston acted on by the oil from line 578 is of considerably greater area than the bottom surface of piston 464 acted on by oil supplied by line 500 so that the piston 464 can be moved downwardly even against the resistance of oil acting on the lower surface thereof. The action occurs with considerable rapidity since it is desirable that the brake G be released before the rear unit clutch F is fully engaged. For best results this brake should be released as soon as initial engagement of the plates 94 and 96 is accomplished so that the acceleration of the reaction annulus from rest can be promptly initiated. Due to the particular drive arrangement in the front planetary unit B, with the mutual reaction afforded by the sun and ring gears, it follows that as soon as the reaction annulus is released from its condition of rest the reaction afforded by the ring gear of the front unit causes the sun gear and the reaction annulus to rotate in the forward direction. However, reliance is not placed on this reaction annulus compelling the sun gear 26 to attain a speed of rotation equal to that of the carrier 20, since this action would not of itself cause the balancing of inertias which is so desirable in the shift from second to third, wherein a double transition takes place, i.e., the ratios of both the front and rear planetary units are changed. Instead the application of the rear unit clutch F causes a simultaneous acceleration of the reaction annulus 48 with a deceleration of the engine and of the coupling C. This action has been described previously and repetition thereof at this time seems unnecessary.

Upon the completion of the double transition in the two gear units each thereof operates in direct drive so that the output shaft 130 rotates at substantially the same speed as the engine, with any difference in speed being that caused by the inherent slipping in the coupling C. The transmission will continue operation in third speed ratio until an appropriate relation between throttle position and output shaft speed requires a shift to fourth speed ratio.

When oil is initially supplied to line 508 part thereof continues through the branch line 573 to act on the left end of land 486 of the timing valve 480 to aid spring 488 in holding this valve in the position shown. Further, a part of the oil passing through the chamber of the ball 572 continues by branch line 577 to the right end of the land 484 of timing valve 480 applying pressure to this end equal to that applied to the left end of the land 486 by the oil introduced thereto through line 573. With the hydraulic pressures balanced, the spring 488 alone can hold the valve in the position illustrated, which is necessary since the function of this valve is utilized only in a particular downshift to be described later. During operation of the transmission in third speed ratio the front pump 76 again is energized by rotation of the sun gear 26 so that it can supply oil through the line 206 to the pressure regulator valve 210. Rear pump 142 is now driven at output shaft speed instead of at overdrive as in first and second speed ratios.

Shift Third to Fourth

With the transmission operating in third speed ratio and with the vehicle still being accelerated governor pressure will eventually reach such a value that the force thereof solely on the plug 348 of the governor plug assembly will move the shift valve 302 further to the right until the groove 318 thereof is engaged by the balls 532. This movement interrupts the supply of oil to the line 504, and hence to the clutch E, and positions the lands 304 and 306 so that oil in the bore between these lands passes both to the lines 508 and 510. Since line 508 received oil in third speed ratio the condition of the mechanism controlled thereby is unchanged. However supply of oil to line 510 causes the engagement of the brake H in timed relation to the exhaust of the clutch E, which latter action occurs due to land 304 being positioned to the right of the port connected to line 504. The oil in this line, and particularly that supplied to the clutch E, is quickly exhausted due to connection of the port of line 504 to the exhaust port at 579. In this fashion the oil previously supplied to the left end of ball 546 is immediately exhausted so that this ball can be unseated by oil coming directly from clutch E and the latter oil can also be quickly exhausted since the restriction 540 is by-passed. Release of clutch E is necessary so that brake H can be engaged. While the clutch E is exhausted quickly the oil below piston 442 of the accumulator 440 is exhausted at a slow rate to prevent interference with the exhaust of the clutch E. As soon as the line 504 is connected to exhaust, oil in line 552 has its pressure reduced so that the ball 554 is immediately seated by pressure in the ball chamber supplied by the accumulator 440. Consequently, oil to be exhausted from this accumulator must pass through line 558 to the restriction 560 and through this restriction into the line 504. The restriction is so dimensioned that oil can drain through the same at a slow rate without interfering with oil being drained from the clutch E. Clutch E is released before brake H is applied, but one-way clutch 25 prevents slipping or loss of torque through the transmission.

The engagement of brake H is accomplished in a manner similar to that described in connection with clutch E in that the oil in line 510 must pass through restriction 580 and continue to the piston 82 of brake H. A branch line 581 extends to the left of the ball 582 to aid the light spring 584 in holding this ball in seated position. Likewise oil passes through branch 586 to unseat ball 588 against the resistance of the light spring 590 and then the oil continues through line 592 to the interior of the accumulator 450 to aid spring 454 in raising the piston 452 against regulated pump pressure supplied by lines 265 and 267. A restriction 594 is located between lines 592 and 510 to be effective only when the accumulator is being discharged.

The supply of oil to the piston 82 of brake H causes a progressive engagement of this brake, which decelerates the sun gear 26 and the reaction annulus 48 until these parts are locked against rotation in either direction. The front unit B in this fashion is again conditioned for overdrive ratio so that the entire transmission now has the overdrive ratio afforded by the front unit, due to the rear unit being in direct drive.

The transmission will remain in fourth speed ratio so long as governor pressure does not fall below such value as will permit throttle valve pressure acting on land 310 to move the shift valve 302 to the left against governor pressure and the resistance of balls 532. In actual operation of this transmission shifts may occur, both upshifts and downshifts, at frequent intervals as required by the relation between throttle valve pressure and governor pressure. Inasmuch as the shifts are accomplished throughout the range of transmission shifting without appreciable jerk, which may be objectionable, such shifts can be depended on to obtain the most efficient operation of the transmission.

Fourth to Third Shift

When operating conditions reach a stage at which throttle valve pressure acting on the land 310 is high enough to move the valve 302 to the left, this valve will again be positioned for actuation of the hydraulic apparatus to establish third speed ratio. The movement of the shift valve 302 to the left causes land 306 to interrupt the supply of oil to line 510 and to connect this line to exhaust at the port 506. Simultaneously the line 504 is again supplied with oil for engagement of clutch E in the manner described in connection with the shift first to second. Exhaust of line 510 relieves the oil pressure holding ball 582 seated so that oil in the cylinder of piston 82 can unseat 582 and become immediately exhausted, by-passing the restriction 580. This causes a very quick release of the brake H so that the reaction annulus can be accelerated from rest to a speed equal to that of the carrier 20. The accumulator 450, however, is exhausted at a retarded rate due to the restriction 594 through which oil in the accumulator must pass since the ball 588 becomes seated once pressure is withdrawn from the left hand surface thereof. In this fashion the accumulator can be exhausted without interfering with the quick release of the brake H.

A particular advantage present in this invention is manifest in the fourth to third shift. Since as before pointed out, the sun gear 26 and the ring gear 24 are differentially driven by the carrier 20, each must offer mutual reaction to the other. Thus when the brake H is released the ring gear 24, being connected to the coupling C, offers greater reaction than is offered by the inertia of sun gear 26 and parts rotating therewith including the annulus 48. The action of the gear unit under this condition is to cause acceleration of the sun gear 26 and the attached annulus 48, and the inertia of this annulus is such that the engine must expend the major part of its energy in driving the transmission rather than in self-acceleration. Consequently, by actual tests it has been determined that the inertia of annulus 48 may be great enough to cause the reaction afforded thereby to cause drive of ring gear 24, and hence of the train of transmission elements in line therewith, to transmit as much as 93% of the energy of the engine to the drive shaft of the vehicle while the remaining 7% of energy created by the engine in its acceleration to a speed equal to that of the drive shaft is expended in overcoming its own inertia. Sun gear 26 can be accelerated only to the same speed as carrier 20 due to one-way clutch 25. In the shift fourth to third therefore, the application of clutch E which locks the ring gear 24 and the sun gear 26 together is delayed due to restriction 540 in line 504 so that advantage can be taken of the reaction afforded by the annulus 48 in maintaining the transmission of torque through the transmission while the engine is being accelerated. The clutch E therefore becomes engaged after a predetermined interval so that the transmission is conditioned for a shift to second speed ratio if the same is required in subsequent operation.

Shift Fourth to Second

Inasmuch as the transmission when operating in fourth speed ratio is actually in overdrive condition, there may be occasions when acceleration of a character afforded only by a gear reduction may be desirable. Under such circumstances a shift from fourth to third will not provide the torque multiplication desired for rapid acceleration, since this shift only changes the transmission from overdrive to direct drive. Therefore, the present arrangement makes possible a sequential shift from fourth to second, with a momentary conditioning of the mechanism in third ratio, when the transmission is operating in fourth speed below a predetermined maximum output shaft speed. Should the vehicle be progressing at a speed of, for example, 35 miles per hour and should the operator thereof require acceleration which can be afforded only by torque multiplication, these results can be obtained by depressing the throttle of the vehicle to full open position so that the throttle valve 360 supplies maximum throttle valve pressure to the right end of land 310. This pressure is sufficient, at the speed before mentioned, to overcome the resistance of balls 532 and governor pressure on the left end of the shift valve train to such an extent that the shift valve can be moved the equivalent of two positions thereof. In other words at the end of this throttle induced movement of the shift valve the groove 314 will be in engagement with the balls 532. In this position of the shift valve only line 504 will be supplied with oil under regulated pump pressure while the lines 508 and 510 will be connected to exhaust at port 506. The line 510 and consequently brake H are quickly exhausted releasing the annulus 48. That part of line 508 between the shift valve bore and restriction 570 is exhausted rapidly by way of port 506, which exhausts pressure in line 571 and also in line 573. Exhaust of pressure in line 571 permits the pressure trapped beyond the restriction 570 at the rear unit clutch F and in the rear servo 460 to seat the ball 572 and prevent reduction of this pressure other than through the restriction 570. Exhaust of oil supplied by line 573 to the left of the land 486 of the timing valve 480 causes the valve 482 to have only the pressure of spring 488 biasing it to the right. However, the trapped pressure before mentioned is present through line 577 at the right end of land 484 and the result will be that valve 482 will be moved to the left placing the branch line 505 in communication with the branch line 507 through the bore of the timing valve 480. When this occurs oil being supplied to line 504 can forthwith pass through line 505 then into line 507 and finally into that part of the line 504 extending directly to the clutch E. Such direction of oil by-passes the restriction 540 so that clutch E is applied with greater rapidity than at a retarded rate previously described.

Engagement of clutch E more quickly than in a shift fourth to third can be accomplished without interfering with the desirable action of accelerating the sun gear 26 and the reaction mass attached thereto, including annulus 48, to a speed equal to that of the carrier 20. At the time a forced fourth to second shift can be made vehicle speed is relatively low and engine speed is relatively low.

Consequently, when the accelerator is moved to the wide open position, the engine can accelerate rapidly from a relatively low speed to a relatively high speed. During such rapid acceleration of the engine the sun gear 26 and its reaction masses will also be accelerated from rest at a high rate. As soon as the sun gear has been accelerated, due to the differential drive arrangement in the front unit, the mechanism is in condition for the application of clutch E which application occurs more quickly than in the situation wherein the engine is rotating at a relatively high speed with the transmission in fourth speed ratio when the shift to third speed ratio is made.

In this fashion advantage is taken of the balancing of accelerated inertia as opposed to decelerated inertia and the transition is made from fourth speed ratio to third speed ratio with a minimum of shock or jerk. With the parts conditioned for third speed operation, it is possible then to complete a shift from third speed ratio to second speed ratio with the complete balancing of inertias in the manner previously described. The end result therefore can be a transition from fourth speed ratio to second speed ratio in a relatively short period of time but with this transition taking place in two steps, each of which employs the principle of balanced inertia. It will be apparent that a shift directly from fourth speed ratio to second speed ratio, if accomplished without the intermediate step, would involve retaining the sun gear 26 and its masses of inertia locked against rotation and with simply a change taking place in the rear unit from direct drive to reduction drive. This change would not involve the balancing of inertias and hence would be of objectionable nature. The manner in which the second step of this transition takes place is set forth immediately hereinafter.

Inasmuch as rear clutch F can be disengaged only by exhaust of oil through the restriction 570, engagement of clutch E will take place before clutch F is released. This action momentarily establishes third speed ratio in the transmission and causes it to operate in that ratio for a very short period, namely that period required to exhaust oil from the top of piston 464 of rear unit servo 460. This oil must be exhausted before oil in line 500 can exert enough pressure on the reduced area subject thereto to move piston 464 upwardly to again apply the brake G. Brake G therefore is applied at a reduced rate relative to the engagement of clutch E and, in fact, the engagement of brake H is timed with the release of clutch F. When clutch F is finally released brake G is engaged so that the transmission again operates in second speed ratio with the reaction sun gear 92 locked against rotation in either direction and likewise the sun gear 26 also locked against rotation in either direction due to the engagement of clutch E.

*Drive Range Third*

The transmission can be conditioned at the will of the operator in such fashion that for normal driving the automatic change in gear ratio will take place as previously described but the transmission will not advance beyond third speed ratio. To accomplish this action the manual valve 220 is moved to the third position which causes the groove 236 to be engaged by the balls 240. Oil supplied to the bore of the manual valve in addition to being distributed through the lines 270, 500 and 530 is also delivered to the line 650 which extends to the right end of the enlarged bore of the automatic shift valve 300. Oil delivered to this bore acts on the right end of the cup shaped member 330 forcing it to the left until the left end thereof is arrested by the stop 652. If the vehicle is at rest when the manual valve is moved to the drive range third position, and the vehicle is then operated for normal acceleration, the transmission will be operated in first speed ratio, automatically shifted to second speed ratio, and then automatically shifted to third speed ratio in the manner just described. However, an automatic shift to fourth speed ratio will not normally take place since the plug 332 has been moved to the left a distance sufficient to cause it to arrest movement to the right of the valve 302 from its third speed position to its fourth speed position. Inasmuch as full regulated pump pressure acts on the large end area of the cup shaped member 330 the force exerted by this oil is sufficient to prevent the governor plug 348 from forcing a movement of the shift valve to fourth position. This is true even though throttle valve pressure is acting on the left end of the plug 332, since the area of the left end of this plug is considerably smaller than the area of the right end of the member 330 and in addition throttle valve pressure does not reach full pump pressure even at full throttle. The flat 336 on plug 332 permits oil under throttle valve pressure to enter the bore of the shift valve 300 between land 310 and plug 332 due to the fact that the oil is supplied to a groove extending completely around the wall of the valve bore.

The manual valve can be moved to the drive range third position at any time during operation of the transmission. If the transmission is operating in any speed ratio below third at the time the manual valve is so moved, the effect will be to limit further automatic shifting of the transmission to the third speed ratio.

If the transmission is operating in fourth speed ratio at the time the manual valve is moved to the drive range third position the effect of such movement will be to cause a forced shift from fourth speed ratio to third speed ratio and a limitation against a subsequent upshift into fourth speed ratio so long as the manual valve remains in this selected position.

*Shift Third to Second*

While the transmission is operating in third speed ratio with the manual valve in the position for the full automatic shifting, including fourth speed ratio, or in the position limiting the transmission to third speed ratio as the top ratio, the shift valve can be moved from its position establishing third speed ratio to its position establishing second speed ratio at any time such movement is called for by the relation of governor pressure and throttle valve pressure. This condition may arise during the normal deceleration of the vehicle to bring it to a stop, or may arise by a deceleration of the vehicle due to the load imposed thereon, such as climbing a hill or the like.

When conditions are such as to make advisable a shift from third speed ratio to second speed ratio, the valve member 302 is moved to the left until the space between lands 304 and 306 can supply oil only to the line 504 and the land 306 lies to the left of the port connected to line 508. Oil in line 508 and the passages connected thereto then is exhausted through the bore of the shift valve to the exhaust port 506. Oil from the rear clutch F and from the upper surface of piston 464 of the servo 460 is then exhausted at a controlled rate through the restriction 570 with the end result that the brake G becomes applied in timed relation to the release of the rear unit clutch F so that when reaction sun gear 92 decelerates to zero, application of the brake G serves to lock sun gear 92 and also sun gear 26 against rotation in either direction, thereby to condition the front unit for overdrive and at the same time condition the rear unit for reduction drive. Second speed ratio is thus again established with a balance of decelerated inertia against accelerated inertia in the manner previously described.

*Drive Range Low*

The transmission can also be conditioned to limit operation thereof to second speed ratio by moving the manual valve 220 to the low position which causes engagement of groove 238 by the balls 240. This movement positions land 226 of the valve to the right of a port connected to line 660 so that oil is supplied from the bore of the manual valve to lines 270, 500, 530, 650 and 660. Oil in line 650 as just described causes a movement of the cup shaped member 330 to the left carrying the plug 332 therewith. Oil now entering the line 660 continues to the left end of the cup shaped member 330 and can proceed into the interior thereof to act on the right end of the plug 332 to move it further to the left until such movement is arrested by contact of the snap ring 334 with the stop 652. Balanced oil pressure will then exist on each end of the cup 330 so that it offers no appreciable resistance to movement to the right should such be compelled by over control operation to be described later. The complete movement of plug 332 to the left places it in position to obstruct movement of the shift valve 300 beyond its second speed position under normal driving operation. This manual valve can be moved to the low position at any time during the operation of the transmission. If the movement is made while the vehicle is at rest the transmission will start in first speed ratio and automatically advance to second speed ratio in the fashion described in connection with drive range. Further advance will not take place under normal driving conditions due to the bar presented by the plug 332.

The parts of the automatic shift valve train are so calibrated that should the transmission be operated at an extremely high engine speed while the manual valve is in the low position, a forced shift from second to third will take place for the protection of the engine. This over control is due to several factors, one of which is that the plug 332 in the low position has its right end area subject to full regulated pump pressure and its left end area of equal size subject to throttle valve pressure. Consequently a force considerably less than that equal to full pump pressure can move the plug to the right and since the cup shaped member 330 has balanced pressures on the right and left end areas thereof, it offers no obstruction to such movement. In second speed position of the shift valve the end areas of the sleeve 344 and the plug 348 are subject to governor pressure which at high transmission speed approaches full pump pressure. The combined areas of the cylinder 344 and the plug 348 are greater than the area of the land 310 which is subject to throttle valve pressure, always a predetermined amount less than full pump pressure. Therefore, at high output shaft speed, indicative of high engine speed, governor pressure acting on the cylinder 344 and the plug 348 will be high enough to move the shift valve to the third speed ratio position thereof. This safety measure prevents continued operation of the vehicle with undue high engine speed.

An over control of the type just described is not deemed necessary for permitting third to fourth speed shift since third speed ratio for this transmission is direct drive with the engine and the output shaft 130 rotating at the same rate. However, the parts could be so calibrated as to cause a forced shift from third speed ratio to fourth speed ratio at extremely high engine speeds.

As before mentioned, the manual valve 220 can be placed in the drive range low position at any time so that unless the vehicle speed is beyond the maximum permitted for second speed operation the transmission will be automatically downshifted from third speed ratio or from fourth speed ratio upon movement of the manual valve to the low position. At high vehicle speed the over control feature just described will prevent the transmission from shifting into second speed from a higher speed ratio until the vehicle speed has diminished.

Shift Second to First

Whenever the transmission is operating in second speed ratio with the manual valve in any of its forward drive range positions, the transmission will be shifted from second speed ratio to first speed ratio whenever the relation of throttle valve pressure and governor pressure is such that throttle valve pressure will overbalance the governor pressure. This can occur during the normal deceleration occuring in the stopping of the vehicle or can occur when the vehicle speed falls below that required by throttle position, such as by increase in load on the vehicle in ascending hills and the like, or a desire on the part of the operator for increased torque multiplication. Movement of the shift valve member 302 from its second speed ratio position to its first speed ratio position, i.e., that shown in the circuit diagram, causes the immediate exhaust of the front clutch E by the connection of the line 504 through the bore of the shift valve to the exhaust port 506. Release of the clutch E releases the sun gear 26 so that it is free to rotate in a forward direction at a speed not exceeding that of the carrier 20 or if the torque is reversed in the transmission, that is in overrun, the sun gear is free to rotate in the backward direction.

In this fashion it will be observed that engine braking is not employed in first speed ratio, since the sun gear 26 is free to rotate backwardly should the ring gear 24 of the front planetary unit be driven by the wheels of the vehicle at a speed in excess of that of the engine and consequently, the carrier 20. In the other speed ratios, engine braking is employed since the sun gear 26 is either compelled to rotate with the ring gear 24 or is braked against rotation in either direction.

Inasmuch as the throttle valve of this transmission supplies pressure to the shift valve train even when the vehicle is at rest and with the engine throttle in its idling condition, such throttle valve pressure may, under certain circumstances, cause a shift from second speed ratio to first speed ratio at a vehicle speed in excess of that normally desired, particularly when the vehicle is being brought to rest. To overcome this objection the modified shift valve train of FIG. 4 may be employed. For the major part the shift valve of FIG. 4 is unchanged from that of the circuit diagram of FIGS. 2 and 2A and accordingly the same reference characters have been applied to the modification. To accommodate this modification the end wall 700 of the shift valve body has been made of increased thickness and is apertured to receive a pin 702 slidable through such aperture. Another body member 704 can be connected to the end wall 700 and such body 704 has an extension bored out to slidably receive a cup shaped piston member 706. Member 706 is biased to the left by spring 708 which spring surrounds the pin 702, the left end of which normally bears against the inner bottom surface of the piston 706. The body 704 is apertured at the left end for the connection of a branch line 710 from the throttle valve supply line 374. The line 710 therefore supplies oil under throttle valve pressure to the left end of the piston 706 to move it to the right against the spring 708. In addition to the oil connection just described, a further connection is provided in the nature of a channel 712 in the body of the shift valve train 300 which channel extends from the bore of the shift valve between lands 304 and 306 of valve member 302 through the wall 700 and into the member 704 to introduce oil into the interior of the piston 706, there to aid spring 708 in holding the piston 706 to the left.

The operation of this embodiment is substantially as follows. Assuming that the shift valve train is in the position shown in FIG. 4, the transmission is conditioned for operation in first speed ratio. In the position shown oil under pump pressure is introduced by line 530 into the bore of the shift valve as previously described and passes through the hollowed out interior 320 of valve 302 to emerge again in the bore between the lands 304 and 306. In this embodiment the oil can continue through the line 712 to enter the bore in the extension 704 and inside of the cup shaped piston 706. At the same time oil under throttle valve pressure is supplied to the left end of the piston 706 through the branch line 710. Since mainline pressure is acting in opposition to throttle valve pressure, throttle valve pressure will never be high enough to move piston 706 to the right and hence the slidable pin 702 will remain in the position shown with one end resting against the end wall of piston 706 and the other end in close proximity to the member 350 of the governor plug assembly. This appendage to the shift valve train has no effect on a shift from first speed ratio to second speed ratio which will occur in the manner described hereinbefore. As soon as the shift valve train has been moved to the right to establish second speed condition in the transmission, the land 304 interrupts the supply of oil to the channel 712 and that channel is then connected to exhaust at the passage 579. Such connection to the exhaust passage will permit oil previously inside of the piston 706 to be exhausted so that throttle valve pressure acting on the left end of piston 706 can move it to the right the distance permitted by the right end of piston 706 contacting the end wall 700 or a plate 701 resting thereagainst. This extent of movement of piston 706 corresponds to the distance the shift valve train moves in progressing from first speed position to second speed position. The pin 702 is forced to move the same distance maintaining its right end in close proximity to the member 350. Further movement of the shift valve train, i.e., to third speed position or fourth speed position, has no effect on the pin 702 which can move at will without producing any result.

However, when the transmission is operating in second speed ratio with the shift valve train properly positioned for such operation, the presence of throttle valve pressure acting on the piston 706 provides an opposition to movement of the shift valve train to the first speed ratio position adding to the opposition offered by governor pressure acting on the governor plug assembly. Consequently, if the vehicle is being brought to rest with the engine throttle in closed, or idling, position, governor pressure must drop to such a low valve that it, when aided by throttle valve pressure on the piston 706, cannot overbalance the effect of throttle valve pressure on the right end of land 310 of the shift valve and the resistance of the balls 532. The end result will be that the transmission will shift automatically from second speed ratio to first speed ratio at a considerably lower vehicle speed, regardless of throttle valve pressure, than would the condition prevalent in the shift valve train arrangement of FIGS. 2 and 2A.

*Shift Second to Fourth*

If the transmission is operating with the manual valve in the drive position which permits automatic shifting to fourth speed ratio and if the vehicle is being accelerated with the transmission in second speed ratio and with the engine throttle wide open, or near wide open, the throttle valve pressure acting on the shift valve train will be high enough to permit the vehicle to attain a considerable speed in second speed condition of the transmission. Should the throttle then be released so that the engine throttle approaches closed position, throttle valve pressure will immediately suddenly decrease by a considerable value with a result that governor pressure will be high enough to move the shift valve train from second speed position to fourth speed position. A transition in the transmission from second speed condition to fourth speed condition would not be desirable and hence the parts of the control system are so calibrated that the brake H will not be applied until the transmission has been permitted to automatically shift from second speed ratio to third speed ratio and then application of brake H will be completed. The purpose of such calibration is to assure that advantage is taken of the inertia balance which occurs in a shift from second speed ratio to third speed ratio and the further balance which occurs in the shift from third speed ratio to fourth speed ratio. In this manner a shift from second speed ratio to fourth speed ratio takes place in steps, each with a partial or complete balancing of inertias instead of in an abrupt transition involving only a change in the rear unit from reduction drive to direct drive.

*Reverse*

Operation of a vehicle having this transmission therein in reverse can be accomplished by moving the manual valve 220 to reverse position which is that illustrated in the drawing. Such movement permits oil from line 262 to pass through the bore of the manual valve to the line 520 which extends to the piston 138 of reverse brake K, moving it to lock the ring gear 126 against rotation in either direction. In this position the lines 270, 500, 530, 650 and 660 are exhausted at the exhaust port 502. Consequently it is impossible to maintain engagement of the clutches E and F and the brakes G and H. Another result of the exhausting of the various lines is that line 270, now being exhausted, removes regulating pressure from the right end of land 254 of the pump pressure regulator valve 250. The only area of this valve subject to the delivered pressure therefore is the right end of the terminal part 252 of the valve. Considerably higher pressure is required to move the valve 250 to the left a distance great enough to establish communication between lines 206 and 284 with the result that regulated pump pressure rises considerably above the maximum which can be attained in the forward drive operation. Throttle valve pressure is still available in reverse operation so that this pressure supplied by line 376 to assist spring 260 can cause a further rise in regulated pump pressure during reverse operation—for example, a maximum of 180 p.s.i. can be obtained.

Engagement of the brake K conditions the rear planetary unit D for reverse drive so that as the engine is accelerated and the front planetary unit is automatically conditioned for direct drive, the turbine 38 of coupling C rotates the sun gear 44 in the same direction as the engine is rotating. However, with the ring gear 126 locked against rotation, drive of the short pinions 122 communicated to the long pinions 124 causes the long pinions to walk around the ring gear 126 in the reverse direction compelling the carrier 120 to rotate therewith and impart reverse rotation to the output shaft 130. With ring gear 126 locked against rotation, rear pump 142 driven thereby is inactive and front pump 76 must supply the oil for the transmission operation.

The present transmission provides a novel automatic step-ratio transmission in which changes in gear or speed ratio can be accomplished with a minimum of inertia jerk to the system. In fact, in the change of speed ratio which involves transition both in the front and rear planetary units, the balancing of accelerated inertias against decelerated inertias causes such transition to be accomplished smoothly and without noticeable jerk. The controls for this mechanism are of simplified nature, particularly in that a single shift valve train is employed for establishing the respective speed ratios under the joint control of throttle and governor pressures. A saving in expenditure of engine energy is also accomplished by the arrangement whereby the front pump operates only in first and third speed ratios and is completely inactive in second and fourth speed ratios. Since normally most drive occurs in fourth speed ratio, the de-energizing or halting of the front pump reduces the load on the engine and the rear pump has capacity sufficient to supply all demands for fluid under pressure. The rear pump being driven by the reverse reaction ring gear 126 of the transmission operates in overdrive during neutral and operation in first and second speed ratios, and at output shaft speed in third and fourth speed ratios, but is inactive in reverse.

It is to be understood that the invention is capable of modification and therefore is to be limited only by the scope of the following claims.

We claim:

1. In a transmission, a power driven input, an output, a gear unit for completing the establishment of a plurality of speed ratios between said input and said output, said gear unit having a driving element connected to said input, a driven element and a reaction element, and added predetermined mass connected to rotate with one of said elements, and friction engaging means for engaging two of said elements to rotate in unison, said engagement causing acceleration and deceleration of gear unit elements and masses connected thereto, the inertia of said added mass being such as to cause the inertia accelerated to be balanced by the inertia decelerated.

2. In a transmission, a power driven input, an output, a gear unit for completing the establishment of a plurality of speed ratios between said input and said output, said gear unit having a driving element connected to said input, a driven element and a reaction element, an added predetermined mass connected to rotate with one of said elements, and friction engaging means for engaging said reaction element and another of said elements to rotate in unison, said engagement causing acceleration and deceleration of gear unit elements and masses connected thereto, the inertia of said added mass being such as to cause the inertia accelerated to be balanced by the inertia decelerated.

3. In a transmission, a power driven input, an output, a gear unit for completing the establishment of a plurality of speed ratios between said input and said output, said gear unit having a driving element connected to said input, a driven element and a reaction element, an added predetermined mass connected to rotate with one of said elements, and friction engaging means for engaging said reaction and driven elements to rotate in unison, said engagement causing acceleration and deceleration of gear unit elements and masses connected thereto, the inertia of said added mass being such as to cause the inertia accelerated to be balanced by the inertia decelerated.

4. In a transmission, a power driven input, an output, a gear unit for completing the establishment of a plurality of speed ratios between said input and said output, said gear unit having a driving element connected to said input, a driven element and a reaction element, an added predetermined mass connected to rotate with one of said elements, and friction engaging means for engaging two of said elements to rotate in unison, said engagement causing acceleration of said reaction element and masses connected thereto and deceleration of driving and driven elements and masses connected thereto, the inertia of said added mass being such as to cause the inertia accelerated to be balanced by the inertia decelerated.

5. In a transmission, a power driven input, an output, a gear unit for completing the establishment of a plurality of speed ratios between said input and said output, said gear unit having a driving element connected to said input, a driven element and a reaction element, an added predetermined mass connected to rotate with one of said elements, and friction engaging means for engaging two of said elements to rotate in unison, said engagement causing acceleration of said reaction element and the masses connected thereto and deceleration of another of said elements and masses connected thereto, the inertia of said added mass being such as to cause the inertia accelerated to be balanced by the inertia decelerated.

6. In a transmission, a power driven input, an output, a gear unit for completing the establishment of a plurality of speed ratios between said input and said output, said gear unit having a driving element connected to said input, a driven element and a reaction element, an added predetermined reaction mass connected to said reaction element to rotate therewith, and friction engaging means for engaging said reaction element and another of said elements to rotate in unison, said engagement causing acceleration of said reaction element and said reaction mass and deceleration of another of said elements and masses connected thereto, the inertia of said added mass being such as to cause the inertia accelerated to be balanced by the inertia decelerated.

7. In a transmission, a power driven input, an output, a gear unit having a driving element connected to said input, a driven element connected to drive said output, and a reaction element, an added predetermined mass connected to rotate with one of said elements, and friction engaging means for engaging said reaction element and another of said elements to rotate in unison, said engagement causing a change in speed of rotation of said reaction element and change in speed of rotation of the other elements, one change being acceleration and the other being deceleration, the inertia of said elements and the parts of said transmission connected to each element being such that accelerated inertia balances decelerated inertia.

8. In a transmission, a power driven input, an output, a gear unit having a driving element connected to said input, a driven element connected to drive said output, and a reaction element, an added predetermined mass connected to rotate with one of said elements, and friction engaging means for engaging said reaction element and another of said elements to rotate in unison, said engagement causing acceleration of said reaction element and deceleration of the other element, the inertia of said elements and the parts of said transmission connected to each element being such that accelerated inertia balances decelerated inertia.

9. In a transmission, a power driven input, an output, a gear unit having a driving element connected to said input, a driven element connected to drive said output, and a reaction element, an added predetermined reaction mass connected to said reaction element for rotation therewith, and friction engaging means for engaging said reaction element and another of said elements to rotate in unison, said engagement causing acceleration of said reaction element and said reaction mass and deceleration of the other element, the inertia of said elements and the parts of said transmission connected to each element being such that accelerated inertia balances decelerated inertia.

10. In a transmission, a power driven input, an output, a gear unit having a driving element connected to said input, a driven element connected to drive said output, and a reaction element, and friction engaging means for engaging said reaction element and another of said elements to rotate in unison, said engagement causing acceleration of said reaction element and deceleration of the other elements, said reaction element having connected thereto for rotation therewith an added reaction mass such that the accelerated inertia of said reaction element and reaction mass balances the decelerated inertia of said other elements and the masses rotating therewith.

11. In a transmission, a power driven input, an output, a gear unit having a driving element connected to said input, a driven element, and a reaction element, an added predetermined mass connected to rotate with one of said elements, and friction engaging means for engaging said reaction element and another of said elements to rotate in unison, said driven element being so connected to said output that said engagement causes acceleration of said reaction element and deceleration of the other elements at different rates, the inertia of said elements and the parts of said transmission connected to each element being such that accelerated inertia balances decelerated inertia.

12. In a transmission, a power driven input, an output, a gear unit having a driving element connected to said input, a driven element, and a reaction element, an added reaction mass connected to said reaction element for rotation therewith, and friction engaging means for engaging said reaction element and another of said elements to rotate in unison, said engagement causing acceleration of said reaction element and said reaction mass and deceleration of the other elements, said driven element being so connected to said output that engagement of said elements to cause all of said elements to rotate in unison decelerates said driving element and the masses connected thereto at one rate and decelerates said driving element and the masses connected thereto at a different rate, the inertia of said elements and the parts of said transmission connected to rotate with each element being such that accelerated inertia balances decelerated inertia.

13. In a transmission, a power driven input, an output, a planetary gear set having planet carrier driven by said input, a driven gear element connected to drive said output, a reaction element, a one-way clutch between said reaction element and said planet carrier for preventing rotation of said reaction element faster than said planet carrier, an added reaction mass connected to said reaction element for rotation therewith, said reaction element and said driven element offering mutual reaction one to the other whereby when the inertia of the driven element is greater than the inertia of said reaction element and said reaction mass said reaction element is rotated at a speed not in excess of that of said planet carrier, and brake means for preventing rotation of said reaction element and said reaction mass, said reaction mass having such inertia that when said brake is released said reaction mass is being accelerated causes transmission of torque from said input to said output.

14. In a transmission, a power driven input, an output, a planetary gear set having planet carrier driven by said input, a driven gear element connected to drive said output, a reaction element, a one-way clutch between said reaction element and said planet carrier for preventing rotation of said reaction element faster than said planet carrier, an added reaction mass connected to said reaction element for rotation therewith, said reaction element and said driven element offering mutual reaction one to the other whereby when the inertia of the driven element is greater than the inertia of said reaction element and said reaction mass said reaction element is rotated at a speed not in excess of that of said planet carrier for establishing direct drive in said gear set, and brake means for preventing rotation of said reaction element and said reaction mass for establishing overdrive ratio in said gear set, said reaction mass having such inertia that when said brake is released said reaction mass in being accelerated maintains transmission of torque from said input to said output.

15. In a transmission, a power driven input, an output, a planetary gear set having planet carrier driven by said input, a driven gear element connected to drive said output, a reaction element, a one-way clutch between said reaction element and said planet carrier for preventing rotation of said reaction element faster than said planet carrier, an added reaction mass connected to said reaction element for rotation therewith, said reaction element and said driven element offering mutual reaction one to the other whereby when the inertia of the driven element is greater than the inertia of said reaction element and said reaction mass said reaction element is rotated at a speed not in excess of that of said planet carrier, and brake means for preventing rotation of said reaction element and said reaction mass, said reaction mass having such inertia that when said brake is released said reaction mass in being accelerated maintains transmission of torque from said input to said output, said reaction element and reaction mass when rotating at the same speed as said planet carrier adding to the inertia of the masses rotating with said input and said driven element whereby the combined masses operate as a flywheel.

16. In a transmission, a power driven input having a mass of predetermined inertia, an output, a planetary gear set having planet carrier driven by said input, a driven gear element connected to drive said output, and having associated therewith masses of predetermined inertia, a reaction element, a one-way clutch between said reaction element and said planet carrier for preventing rotation of said reaction element faster than said planet carrier, an added reaction mass connected to said reaction element for rotation therewith, said reaction mass having a predetermined inertia, said reaction element and said driven element offering mutual reaction one to the other whereby when the inertia of the driven element is greater than the inertia of said reaction element and said reaction mass said reaction element is rotated at a speed not in excess of that of said planet carrier to establish direct drive in said gear set, and brake means for preventing rotation of said reaction element and said reaction mass to establish overdrive in said gear set, said reaction mass having such inertia that when said brake is released said reaction mass in being accelerated maintains transmission of torque from said input to said output, said reaction element and reaction mass when rotating at the same speed as said planet carrier adding to the inertia of the masses rotating with said input and said driven element whereby the combined masses operate as a flywheel.

17. In a transmission, a power driven input, an output, first and second gear units between said input and said output, said first gear unit having a driving element connected to said input, a driven element and a reaction element, said driven element being connected through a hydrodynamic drive device to drive a driving element of said second gear unit, said second gear unit also having a reaction element and a driven element, said driven element of the second unit being connected to said output, brake means for holding the reaction element of said second unit against rotation, friction engaging means for connecting the reaction element of the first unit to the reaction element of the second unit whereby both reaction elements are held against rotation by the same brake means, and friction engaging means for causing the reaction elements of said units to be rotated in unison with the driven element of the first unit while the driving element of the second gear set is driven through said hydrodynamic drive device.

18. In a transmission, a power driven input, an output, first and second gear units between said input and said output, said first gear unit having a driving element connected to said input, a driven element and a reaction element, a hydrodynamic drive device having driving and driven members, said driving member being connected to the driven element of the said first gear unit, said driven member being connected to a driving element of said second gear unit, said second gear unit also having a reaction element and a driven element, said driven element of the second unit being connected to said output, brake means for holding the reaction element of said second unit against rotation, friction engaging means for connecting the reaction element of the first unit to the reaction element of the second unit whereby both reaction elements are held against rotation by the same brake means, and friction engaging means for causing the reaction elements of said units to be rotated in unison with the driven element of the first unit when said brake means is released.

19. In a transmission, a power driven input, an output, first and second gear units between said input and said output, said first gear unit having a driving element connected to said input, a driven element and a reaction element, a hydrodynamic drive device having driving and driven members, said driving member being connected to the driven element of said first gear unit, said driven member being connected to a driving element of said second gear unit, said second gear unit also having a reaction element and a driven element, said driven element of the second unit being connected to said output, brake means for holding the reaction element of said second unit against rotation, friction engaging means for connecting the reaction element of the first unit to the reaction element of the second unit whereby both reaction elements are held against rotation by the same brake means, friction engaging means for causing the reaction elements of said units to be rotated in unison with the driven element of the first unit when said brake means is released whereby two paths for torque are provided from said first unit to said second unit, and a first unit brake for holding the reaction element of said first gear unit against rotation when said brake means and said first friction engaging means are released.

20. In a transmission, a power driven input having mass of predetermined inertia, an output, first and second gear units between said input and said output, said first gear unit having a planet carrier connected to said input, a driven element and a reaction element, a reaction mass of predetermined inertia connected to said reaction element, said driven element being connected to drive a driving element of said second gear unit, said second gear unit also having a reaction element and a driven element, said driven element of the second unit being connected to said output, brake means for holding the reaction element of said second unit against rotation to establish reduction drive in said second gear unit, first clutch means for connecting the reaction element of the first unit to the reaction element of the second unit whereby both reaction elements are held against rotation by the same brake means to establish overdrive in said first gear unit while reduction drive in said second gear unit is maintained, and second clutch means for causing the reaction elements of said units to be rotated in unison with the driven element of the first unit when said brake means is released, application of said second clutch causing acceleration of the reaction element of said first gear unit and said reaction mass and deceleration of said driven element of said first gear unit at one rate and deceleration of said carrier and input mass at a different rate, said masses having such inertias that the inertia of decelerating masses is balanced by the inertia of accelerating masses.

21. In a transmission, a power driven input having mass of predetermined inertia, an output, first and second gear units between said input and said output, said first gear unit having a planet carrier connected to said input, a driven element and a reaction element, a reaction mass of predetermined inertia connected to said reaction element, said driven element being connected to drive a driving element of said second gear unit, said second gear unit also having a reaction element and a driven element, said driven element of the second unit being connected to said output, brake means for holding the reaction element of said second unit against rotation to establish reduction drive in said second gear unit, first clutch means for connecting the reaction element of the first unit to the reaction element of the second unit whereby both reaction elements are held against rotation by the same brake means to establish overdrive in said first gear unit while reduction drive in said second gear unit is maintained, second clutch means for causing the reaction elements of said units to be rotated in unison with the driven element of the first unit when said brake means is released, application of said second clutch causing acceleration of the reaction element of said first gear unit and said reaction mass and deceleration of said driven element of said first gear unit at one rate and deceleration of said carrier and input mass at a different rate, said masses having such inertias that the inertia of decelerating masses is balanced by the inertia of accelerating masses, and a first unit brake for holding the reaction element of said first gear unit against rotation when said brake means and said first clutch means are released.

22. In a transmission, a power driven input having mass of predetermined inertia, an output, first and second gear units between said input and said output, said first gear unit having a planet carrier connected to said input, a driven element and a reaction element, a reaction mass of predetermined inertia connected to said reaction element, a hydrodynamic drive device having driving and driven members, said driving member being connected to the driven element of said first gear unit, said driven member being connected to a driving element of said second gear unit, said second gear unit also having a reaction element and a driven element, said driven element of the second unit being connected to said output, brake means for holding the reaction element of said second unit against rotation, first clutch means for connecting the reaction element of the first unit to the reaction element of the second unit whereby both reaction elements are held against rotation by the same brake means, second clutch means for causing the reaction elements of said units to be rotated in unison with the driven element of the first unit when said brake means is released, application of said second clutch means causing acceleration of said reaction element of said first gear unit and said reaction element and deceleration of said driven element of said first unit and said hydrodynamic drive device at one rate and deceleration of said planet carrier and input mass at a different rate, said masses and said hydrodynamic drive device having such inertias that the inertias of accelerating masses are balanced by the inertias of decelerating masses.

23. In a transmission, a power driven input having mass of predetermined inertia, an output, first and second gear units between said input and said output, said first gear unit having a planet carrier connected to said input, a driven element and a reaction element, a reaction mass of predetermined inertia connected to said reaction element, a hydrodynamic drive device having driving and driven members, said driving member being connected to the driven element of said first gear unit, said driven member being connected to a driving element of said second gear unit, said second gear unit also having a reaction element and a driven element, said driven element of the second unit being connected to said output, brake means for holding the reaction element of said second unit against rotation, first clutch means for connecting the reaction element of the first unit to the reaction element of the second unit whereby both reaction elements are held against rotation by the same brake means, second clutch means for causing the reaction elements of said units to be rotated in unison with the driven element of the first unit when said brake means is released, application of said second clutch means causing acceleration of said reaction element of said first gear unit and said reaction element and deceleration of said driven element of said first unit and said hydrodynamic drive device at one rate and deceleration of said planet carrier and input mass at a different rate, said masses and said hydrodynamic drive device having such inertias that the inertias of accelerating masses are balanced by the inertias of decelerating masses, and a first unit brake for holding the reaction element of said first gear unit against rotation when said brake means and said first clutch means are released and said second clutch means is applied.

24. In a transmission, a power driven input, an output, gearing intermediate said input and said output, hydraulically actuated friction engaging devices for conditioning said gearing to establish a plurality of gear ratios between said input and said output, a source of fluid under pressure, manually operated valve means for regulating the pressure of liquid from said source, a governor driven by said transmission and regulating the pressure of liquid from said source in accordance with the speed of rotation of said governor, a shift valve train, said train including a shift valve for controlling the supply of fluid from said source to said friction engaging means, said shaft valve having a first position and being movable to a plurality of successive positions from said first position for the supply of fluid to and exhaust of fluid from selected friction engaging devices for determining the gear ratio between said input and said output, said train including an assembly of sliding members subject to regulated pressure from said governor to move said shift valve in one direction, said assembly operating in response to increasing pressure from said governor to move said shift valve to successive positions thereof, and means for supplying fluid from said manually operated regulator valve to said shift valve to oppose movement thereof by the pressure supplied to said assembly by said governor, said train including a stop plug normally positioned at the end of the path of movement of said shift valve in one direction, a manual control valve for supplying fluid from said source to move said stop plug to either of two positions defining different limited paths of movement of said shift valve in said one direction.

25. In a transmission, a power driven input, an output, gearing intermediate said input and said output, hydraulically actuated friction engaging devices for conditioning said gearing to establish a plurality of gear ratios between said input and said output, a source of fluid under pressure, manually operated valve means for regulating the pressure of liquid from said source, a governor driven by said transmission and regulating the pressure of liquid from said source in accordance with the speed of rotation of said governor, a shift valve train, said train including a shift valve member for controlling the supply of fluid from said source to said friction engaging means, said shift valve having a plurality of positions for the supply of fluid to and exhaust of fluid from selected friction engaging devices for determining the gear ratio between said input and said output, said train including an assembly of sliding members subject to regulated pressure from said governor to move said shift valve in one direction, stop means for successively arresting movement of component parts of said assembly whereby increasing pressure from said governor acts on successively smaller areas of said assembly to move said shift valve to successive positions thereof, and means for supplying fluid from said manually operated regulator valve to said shift valve to oppose movement thereof by the pressure supplied to said assembly by said governor, said train including a stop plug normally positioned at the end of the path of movement of said shift valve in one direction, a manual control valve for supplying fluid from said source to move said stop plug to either of two positions defining different limited paths of movement of said shift valve in said one direction.

26. In a transmission, a power driven input, an output, gearing intermediate said input and said output, hydraulically actuated friction engaging devices for conditioning said gearing to establish a plurality of gear ratios between said input and said output, a source of fluid under pressure, manually operated valve means for regulating the pressure of liquid from said source, a governor driven by said transmission and regulating the pressure of liquid from said source in accordance with the speed of rotation of said governor, a shift valve train, said train including a shift valve member for controlling the supply of fluid from said source to said friction engaging means, said shift valve having a plurality of positions for the supply of fluid to and exhaust of fluid from selected friction engaging devices for determining the gear ratio between said input and said output, said train including an assembly of telescoped sliding members the end areas of which are subject to regulated pressure from said governor, spaced stop members for successively arresting movement of said sliding members whereby increasing pressure from said governor acts on successively smaller areas to move said shift valve to successive positions thereof, and means for supplying fluid from said manually operated regulator valve to said shift valve to oppose movement thereof by the pressure supplied to said assembly by said governor, said train including a stop plug normally positioned at the end of the path of movement of said shift valve in one direction, a manual control valve for supplying fluid from said source to move said stop plug to either of two positions defining different limited paths of movement of said shift valve in said one direction.

27. In a transmission, a power driven input, an output, gearing intermediate said input and said output, hydraulically actuated friction engaging devices for conditioning said gearing to establish a plurality of gear ratios between said input and said output, a source of fluid under pressure, manually operated valve means for regulating the pressure of liquid from said source, a governor driven by said transmission and regulating the pressure of liquid from said source in accordance with the speed of rotation of said governor, a shift valve train, said train including a shift valve member for controlling the supply of fluid from said source to said friction engaging means, said shift valve having a plurality of positions for the supply of fluid to and exhaust of fluid from selected friction engaging devices for determining the gear ratio between said input and said output, said train including an assembly of concentric telescoped sliding members the end areas of which are subject to regulated pressure from said governor, a stop for limiting movement of the outermost of said telescoped members toward said shift valve, a spaced stop for limiting movement of the next inward of said telescoped members toward said shift valve, the innermost of said telescoped members contacting said shift valve, a projection carried by said outermost member for compelling the next inward member to move therewith toward said shift valve, a projection carried by said next inward member for compelling the innermost member to move therewith during movement of the next inward member toward said shift valve, said spaced stops successively arresting movement of said outermost and the next inward of said telescoped members whereby increasing pressure from said governor acts on successively smaller areas to move said shift valve to successive positions thereof, means for supplying fluid from said manually operated regulator valve to said shift valve to oppose movement thereof under the pressure supplied to said assembly by said governor, said train including a stop plug normally positioned at the end of the path of movement of said shift valve in one direction, a manual control valve for supplying fluid from said source to move said stop plug to either of two positions defining different limited paths of movement of said shift valve in said one direction.

28. In a transmission, a power driven input, an output, a source of fluid under pressure, first and second gear units between said input and said output, said first gear unit having a driving element connected to said input, a driven element and a reaction element, said driven element being connected through a hydrodynamic drive device to drive a driving element of said second gear unit, said second gear unit also having a reaction element and a driven element, said driven element of the second unit being connected to said output, hydraulically actuated brake means for holding the reaction element of said second unit against rotation, first hydraulically actuated friction engaging means for connecting the reaction element of the first unit to the reaction element of the second unit whereby both reaction elements are held against rotation by the same brake means, second hydraulically actuated friction engaging means for causing the reaction elements of said units to be rotated in unison with the driven element of the first unit while the driving element of said second gear set is driven through said hydrodynamic drive device, and a shift valve movable to a plurality of positions, said shift valve in one of said positions completing a path for fluid from said source to said first friction engaging means.

29. In a transmission, a power driven input, an output, a source of fluid under pressure, first and second gear units between said input and said output, said first gear unit having a driving element connected to said input, a driven element and a reaction element, said driven element being connected through a hydrodynamic drive device to drive a driving element of said second gear unit, said second gear unit also having a reaction element and a driven element, said driven element of the second unit being connected to said output, hydraulically actuated brake means for holding the reaction element of said second unit against rotation, first hydraulically actuated friction engaging means for connecting the reaction element of the first unit to the reaction element of the second unit whereby both reaction elements are held against rotation by the same brake means, second hydraulically actuated friction engaging means for causing the reaction elements of said units to be rotated in unison with the driven element of the first unit while the driving element of said second gear set is driven through said hydrodynamic drive device, and a shift valve movable to a plurality of positions, said shift valve in one of said positions completing a path for fluid from said source to said first friction engaging means, said shift valve having another position completing a path for fluid from said source to said second friction engaging means and to said brake means to cause engagement of said second friction engaging means and release of said brake means.

30. In a transmission, a power driven input, an output, a source of fluid under pressure, first and second gear units between said input and said output, said first gear unit having a driving element connected to said input, a driven element and a reaction element, said driven element being connected to drive a driving element of said second gear unit, said second gear unit also having a reaction element and a driven element, said driven element of the second unit being connected to said output, hydraulically actuated brake means for holding the reaction element of said second unit against rotation, first hydraulically actuated friction engaging means for connecting the reaction element of the first unit to the reaction element of the second unit whereby both reaction elements are held against rotation by the same brake means, second hydraulically actuated friction engaging means for causing the reaction elements of said units to be rotated in unison with the driven element of the first unit, a hydraulically acuated first unit brake for holding the reaction element of said first gear unit against rotation, and a shift valve movable to first, second and third positions, said shift valve in first position completing a path for fluid from said source to said first friction engaging means.

31. In a transmission, a power driven input, an output, a source of fluid under pressure, first and second gear units between said input and said output, said first gear unit having a driving element connected to said input, a driven element and a reaction element, said driven element being connected to drive a driving element of said second gear unit, said second gear unit also having a reaction element and a driven element, said driven element of the second unit being connected to said output, hydraulically actuated brake means for holding the reaction element of said second unit against rotation, first hydraulically actuated friction engaging means for connecting the reaction element of the first unit to the reaction element of the second unit whereby both reaction elements are held against rotation by the same brake means, second hydraulically actuated friction engaging means for causing the reaction elements of said units to be rotated in unison with the driven element of the first unit, a hydraulically actuated first unit brake for holding the reaction element of said first gear unit against rotation, and a shift valve movable to first, second and third positions, said shift valve in first position completing a path for fluid from said source to said first friction engaging means, said shift valve in second position completing a path for fluid from said source to said second friction engaging means and to said brake means to cause engagement of said second friction engaging means and release of said brake means, said shift valve in second position maintaining the path from said source to said first friction engaging means.

32. In a transmission, a power driven input, an output, a source of fluid under pressure, first and second gear units between said input and said output, said first gear unit having a driving element connected to said input, a driven element and a reaction element, said driven element being connected to drive a driving element of said second gear unit, said second gear unit also having a reaction element and a driven element, said driven element of the second unit being connected to said output, hydraulically actuated brake means for holding the reaction element of said second unit against rotation, first hydraulically actuated friction engaging means for connecting the reaction element of the first unit to the reaction element of the second unit whereby both reaction elements are held against rotation by the same brake means, second hydraulically actuated friction engaging means for causing the reaction elements of said units to be rotated in unison with the driven element of the first unit, a hydraulically actuated first unit brake for holding the reaction element of said first gear unit against rotation, and a shift valve movable to first, second and third positions, said shift valve in first position completing a path for fluid from said source to said first friction engaging means, said shift valve in second position completing a path for fluid from said source to said second friction engaging means and to said brake means to cause engagement of said second friction engaging means and release of said brake means, said shift valve in second position maintaining the path from said source to said first friction engaging means, said shift valve in third position establishing a path for fluid from said source to said first unit brake and maintaining said path from said source to said second friction engaging means and to said brake means, said shift valve in said third position interrupting the path from said source to said first friction engaging means for the release thereof.

33. In a transmission, a power driven input, an output, a source of fluid under pressure, first and second gear units between said input and said output, said first gear unit having a driving element connected to said input, a driven element and a reaction element, said driven element being connected to drive a driving element of said second gear unit, said second gear unit also having a reaction element and a driven element, said driven element of the second unit being connected to said output, hydraulically actuated brake means for holding the reaction element of said second unit against rotation, first hydraulically actuated friction engaging means for connecting the reaction element of the first unit to the reaction element of the second unit whereby both reaction elements are held against rotation by the same brake means, second hydraulically actuated friction engaging means for causing the reaction elements of said units to be rotated in unison with the driven element of the first unit, a hydraulically actuated first unit brake for holding the reaction element of said first gear unit against rotation, and a shift valve movable to first, second and third positions, said shift valve in third position establishing a path for fluid from said source to first unit brake and from said source to said second friction engaging means and to said brake means to cause engagement of said second friction engaging means and release of said brake means, said shift valve when moved from third position to second position interrupting the path from said source to said first unit brake for causing release thereof and establishing a restricted path from said source to said first friction engaging means for causing delayed engagement of said first friction engaging means relative to the release of said first unit brake.

34. In a transmission, a power driven input, an output, a source of fluid under pressure, first and second gear units between said input and said output, said first gear unit having a driving element connected to said input, a driven element and a reaction element, said driven element being connected to drive a driving element of said second gear unit, said second gear unit also having a reaction element and a driven element, said driven element of the second unit being connected to said output, hydraulically actuated brake means for holding the reaction element of said second unit against rotation, first hydraulically actuated friction engaging means for connecting the reaction element of the first unit to the reaction element of the second unit whereby both reaction elements are held against rotation by the same brake means, second hydraulically actuated friction engaging means for causing the reaction elements of said units to be rotated in unison with the driven element of the first unit, a hydraulically actuated first unit brake for holding the reaction element of said first gear unit against rotation, and a shift valve movable to first, second and third positions, said shift valve in third position establishing a path for fluid from said source to first unit brake and from said source to said second friction engaging means and to said brake means to cause engagement of said second friction engaging means and release of said brake means, said shift valve when moved from third position to second position interrupting the path from said source to said first unit brake for causing release thereof and establishing a restricted path from said source to said first friction engaging means for causing delayed engagement of said first friction engaging means relative to the release of said first unit brake, said shift valve when moved from third position to first position interrupting the path for fluid from said source to said first unit brake, interrupting the path from said source to second friction engaging means and said brake means and establishing a restricted path for fluid from said source to said first friction engaging means, and a timing valve by-passing said last mentioned restricted path with a free path whereby said first friction engaging means can be applied before the path to said second friction engaging means and said brake means is exhausted.

35. In a transmission, a power driven input, an output, gearing intermediate said input and said output, hydraulically actuated friction engaging devices for conditioning said gearing to establish a plurality of speed ratios between said input and said output, a source of fluid under pressure, a shift valve for controlling the supply of fluid from said source to said friction engaging means, said shift valve being movable to a plurality of positions for the supply of fluid to and exhaust of fluid from selected friction engaging devices for determining a plurality of successively higher speed ratios between said input and said output, said shift valve being movable from position establishing highest speed ratio to position establishing second lower speed ratio, and means operative only when said shift valve is so moved to cause the momentary establishment of the speed ratio immediately lower than highest speed ratio before the second lower speed ratio is established.

36. In a transmission, a power driven input, an output, gearing intermediate said input and said output, hydraulically actuated friction engaging devices for conditioning said gearing to establish a plurality of speed ratios between said input and said output, a source of fluid under pressure, a shift valve for controlling the supply of fluid from said source to said friction engaging means, said shift valve being movable to a plurality of positions for the supply of fluid to and exhaust of fluid from selected friction engaging devices for determining a plurality of successively higher speed ratios between said input and said output, said shift valve being movable from position establishing highest speed ratio to position establishing second lower speed ratio, and timing valve means operative only when said shift valve is so moved to cause the momentary establishment of the speed ratio immediately lower than highest speed ratio before the second lower speed ratio is established.

37. In a transmission, a power driven input, an output, gearing intermediate said input and said output, hydraulically actuated friction engaging devices for conditioning said gearing to establish a plurality of speed ratios between said input and said output, a source of fluid under pressure, a shift valve for controlling the supply of fluid from said source to said friction engaging means, said shift valve being movable to a plurality of positions for the supply of fluid to and exhaust of fluid from selected friction engaging devices for determining a plurality of successively higher speed ratios between said input and said output, means operating when said shift valve is moved from position establishing highest speed ratio to position establishing the next lower speed ratio for causing normal delayed actuation of one of said friction engaging devices, and means operating when said shift valve is moved from position establishing highest speed ratio to position establishing second lower speed ratio for causing accelerated actuation of said normally delayed friction engaging device to momentarily establish said next lower speed ratio.

38. In a transmission, a power driven input, an output, a gear unit for completing the establishment of a plurality of speed ratios between said input and said output, said gear unit having a driving element connected to said input, a driven element and a reaction element, an added predetermined mass connected to rotate with one of said elements, friction engaging means for preventing rotation of said reaction element, and friction engaging means for engaging two of said elements to rotate in unison, engagement of one of said friction engaging means in timed relation to release of the other friction engaging means causing acceleration and deceleration of gear unit elements and masses connected thereto, the inertia accelerated being balanced by the inertia decelerated.

39. In a transmission, a power driven input, an output, a gear unit for completing the establishment of a plurality of speed ratios between said input and said output, said gear unit having a driving element connected to said input, a driven element and a reaction element, an added predetermined mass connected to rotate with one of said elements, friction engaging means for preventing rotation of said reaction element, and friction engaging means for engaging said reaction element and another of said elements to rotate in unison, engagement of one of said friction engaging means in timed relation to release of the other friction engaging means causing acceleration and deceleration of gear unit elements and masses connected thereto, the inertia accelerated being balanced by the inertia decelerated.

40. In a transmission, a power driven input, an output, a gear unit for completing the establishment of a plurality of speed ratios between said input and said output, said gear unit having a driving element connected to said input, a driven element and a reaction element, an added predetermined mass connected to rotate with one of said elements, friction engaging means for preventing rotation of said reaction element, and friction engaging means for engaging said reaction and driven elements to rotate in unison, engagement of one of said friction engaging means in timed relation to release of the other friction engaging means causing acceleration and deceleration of gear unit elements and masses connected thereto, the inertia accelerated being balanced by the inertia decelerated.

41. In a transmission, a power driven input, an output, a gear unit for completing the establishment of a plurality of speed ratios between said input and said output, said gear unit having a driving element connected to said input, a driven element and a reaction element, a brake for preventing rotation of said reaction element, an added predetermined mass connected to rotate with one of said elements, and friction engaging clutch means for engaging two of said elements to rotate in unison, engagement of said clutch means in timed relation to release of said brake causing acceleration of said reaction element and masses connected thereto and deceleration of driving and driven elements and masses connected thereto, the inertia accelerated being balanced by the inertia decelerated, engagement of said brake in timed relation to release of said clutch means causing deceleration of said reaction element and masses connected thereto and acceleration of driving and driven elements and masses connected thereto, the inertia accelerated being substantially balanced by the inertia decelerated.

42. In a transmission, a power driven input, an output, a gear unit having a driving element connected to said input, a driven element connected to drive said output, and a reaction element, an added predetermined mass connected to rotate with one of said elements, friction engaging means for preventing rotation of said reaction element, and friction engaging means for engaging said reaction element and another of said elements to rotate in unison, engagement of either of said friction engaging elements in timed relation to release of the other thereof causing a change in speed of rotation of said reaction element and change in speed of rotation of the other elements, one change being acceleration and the other being deceleration, the inertia of said elements and the parts of said transmission connected to each element being such that accelerated inertia balances decelerated inertia.

43. In a transmission, a power driven input, an output, a gear unit having a driving element connected to said input, a driven element connected to drive said output, and a reaction element, a brake for said reaction element, and friction engaging clutch means for engaging said reaction element and another of said elements to rotate in unison, engagement of said clutch means causing acceleration of said reaction element and deceleration of the other elements, said reaction element having connected thereto for rotation therewith an added reaction mass such that the accelerated inertia of said reaction element and reaction mass balances the decelerated inertia of said other elements and the masses rotating therewith, engagement of said brake in timed relation to release of said clutch means causing deceleration of said reaction element and acceleration of the other elements with substantial balancing of accelerated and decelerated inertias.

44. In a transmission, a power driven input, an output, a gear unit having a driving element connected to said input, a driven element, and a reaction element, brake for said reaction element, an added predetermined mass connected to rotate with one of said elements, and friction engaging clutch means for engaging said reaction element and another of said elements to rotate in unison, said driven element being so connected to said output that engagement of said clutch means causes acceleration of said reaction element and deceleration of the other elements at different rates, and engagement of said brake in timed relation to release of said clutch means causes deceleration of said reaction element and acceleration of the other elements at different rates, the inertia of said elements and the parts of said transmission connected to each element being such that accelerated inertia balances decelerated inertia.

45. In a transmission, a power driven input, an output, a gear unit having a driving element connected to said input, a driven element, and a reaction element, a reaction mass connected to said reaction element for rotation therewith, a brake for said reaction element, an added predetermined mass connected to rotate with one of said elements, and friction engaging clutch means for engaging said reaction element and another of said elements to rotate in unison, engagement of said clutch means causing acceleration of said reaction element and said reaction mass and deceleration of the other elements, said driven element being so connected to said output that engagement of said elements to cause all of said elements to rotate in unison decelerates said driving element and the masses connected thereto at one rate and decelerates said driven element and the masses connected thereto at a different rate, engagement of said brake in timed relation to release of said clutch means causing deceleration of said reaction element and said reaction mass and acceleration of said driving element and said driven element and the masses connected to each thereof at different rates, the inertia of said elements and the parts of said transmission connected to rotate with each element being such that accelerated inertia substantially balances decelerated inertia.

46. In a transmission, a power driven input, an output, gearing intermediate said input and said output, hydraulically actuated friction engaging devices for conditioning said gearing to establish a first year ratio and a plurality of successive gear ratios between said input and said output, a source of fluid under pressure, manually operated valve means for regulating the pressure of liquid from said source, a governor driven by said transmission and regulating the pressure of liquid from said source in accordance with the speed of rotation of said governor, a manually operated valve movable to position directing fluid to establish said first gear ratio, a shift valve train, said train including a shift valve for controlling the supply of fluid from said source to said friction engaging means, said shift valve having a first position which is maintained while said first gear ratio is maintained said shift valve being movable to a plurality of successive positions for the supply of fluid to and exhaust of fluid from selected friction engaging devices for determining the successive gear ratios between said input and said output, said train including an assembly of sliding members subject to regulated pressure from said governor to move said shift valve in one direction, said assembly operating in response to increasing pressure from said governor to move said shift valve to successive positions thereof, means for supplying fluid from said manually operated regulator valve to said shift valve to oppose movement thereof by the pressure supplied to said assembly by said governor, and means for causing fluid from said manually operated regulator valve to assist regulated pressure from said governor in resisting movement of said shift valve from its second position to its first position.

47. In a transmission, a power driven input, an output, gearing intermediate said input and said output, hydraulically actuated friction engaging devices for conditioning said gearing to establish a plurality of gear ratios between said input and said output, a source of fluid under pressure, manually operated valve means for regulating the pressure of liquid from said source, a governor driven by said transmission and regulating the pressure of liquid from said source in accordance with the speed of rotation of said governor, a shift valve train, said train including a shift valve for controlling the supply of fluid from said source to said friction engaging means, said shift valve having a plurality of positions for the supply of fluid to and exhaust of fluid from selected friction engaging devices for determining the gear ratio between said input and said output, said train including an assembly of sliding members subject to regulated pressure from said governor to move said shift valve in one direction, stop means for successively arresting movement of component parts of said assembly whereby increasing pressure from said governor acts on successively smaller areas of said assembly to move said shift valve from first position to successive positions thereof, means for supplying fluid from said manually operated regulator valve to said shift valve to oppose movement thereof by the pressure supplied to said assembly by said governor, a piston member movable in the path of movement of said train, said piston being subject to pressure from said manually operated regulator valve to assist pressure from said governor to delay movement of said shift valve from its second position to its first position.

48. In a transmission, a power driven input, an output, gearing intermediate said input and said output, hydraulically actuated friction engaging devices for conditioning said gearing to establish a plurality of gear ratios between said input and said output, a source of fluid under pressure, manually operated valve means for regulating the pressure of liquid from said source, a governor driven by said transmission and regulating the pressure of liquid from said source in accordance with the speed of rotation of said governor, a shift valve train, said train including a shift valve member for controlling the supply of fluid from said source to said friction engaging means, said shift valve having a plurality of positions for the supply of fluid to and exhaust of fluid from selected friction engaging devices for determining the gear ratio between said input and said output, said train including an assembly of telescoped sliding members the end areas of which are subjected to regulated pressure from said governor, spaced stop members for successively arresting movement of said sliding members whereby increasing pressure from said governor acts on successively smaller areas to move said shift valve from first position to successive positions thereof, means for supplying fluid from said manually operated regulator valve to said shift valve to oppose movement thereof by the pressure supplied to said assembly by said governor, a piston member movable in the path of movement of said train, said piston being subject to pressure from said manually operated regulator valve to assist pressure from said governor to delay movement of said shift valve from its second position to its first position.

49. In a transmission, a power driven input, an output, gearing intermediate said input and said output, hydraulically actuated friction engaging devices for conditioning said gearing to establish a plurality of gear ratios between said input and said output, a source of fluid under pressure, manually operated valve means for regulating the pressure of liquid from said source, a governor driven by said transmission and regulating the pressure of liquid from said source in accordance with the speed of rotation of said governor, a shift valve train, said train including a shift valve member for controlling the supply of fluid from said source to said friction engaging means, said shift valve having a plurality of positions for the supply of fluid to and exhaust of fluid from selected friction engaging devices for determining the gear ratio between said input and said output, said train including an assembly of concentric telescoped sliding members the end areas of which are subject to regulated pressure from said governor, a stop for limiting movement of the outermost of said telescoped members toward said shift valve, a spaced stop for limiting movement of the next inward of said telescoped members toward said shift valve, the innermost of said telescoped members contacting said shift valve, a projection carried by said outermost member for compelling the next inward member to move therewith toward said shift valve, a projection carried by said next inward member for compelling the innermost member to move therewith during movement of the next inward member toward said shift valve, said spaced stops successively arresting movement of said outermost and the next inward of said telescoped members whereby increasing pressure from said governor acts on successively smaller areas to move said shift valve from first position to successive positions thereof, means for supplying fluid from said manually operated regulator valve to said shift valve to oppose movement thereof under the pressure supplied to said assembly by said governor, a piston member movable in the path of movement of said train, said piston being subject to pressure from said manually operated regulator valve to assist pressure from said governor to delay movement of said shift valve from its second position to its first position.

50. In a transmission, a power driven input, an output, gearing intermediate said input and said output, hydraulically actuated friction engaging devices for conditioning said gearing to establish a plurality of gear ratios between said input and said output, a source of fluid under pressure, manually operated valve means for regulating the pressure of liquid from said source, a governor driven by said transmission and regulating the pressure of liquid from said source in accordance with the speed of rotation of said governor, a shift valve train, said train including a shift valve for controlling the supply of fluid from said source to said friction engaging means, said shift valve having a plurality of positions for the supply of fluid to and exhaust of fluid from selected friction engaging devices for determining the gear ratio between said input and said output, said train including an assembly of sliding members subject to regulated pressure from said governor to move said shift valve in one direction, said assembly operating in response to increasing pressure from said governor to move said shift valve from first position to successive positions thereof, means for supplying fluid from said manually operated regulator valve to said shift valve to oppose movement thereof by the pressure supplied to said assembly by said governor, said train including a stop plug normally positioned at the end of the path of movement of said shift valve in one direction, a manual control valve for supplying fluid from said source to move said stop plug to either of two positions defining different limited paths of movement of said shift valve in said one direction, a piston member movable in the path of movement of said train, said piston being subject to pressure from said manually operated regulator valve to assist pressure from said governor to delay movement of said shift valve from its second position to its first position.

51. In a transmission, a power driven input, an output, gearing intermediate said input and said output, hydraulically actuated friction engaging devices for conditioning said gearing to establish a plurality of gear ratios between said input and said output, a source of fluid under pressure, manually operated valve means for regulating the pressure of liquid from said source, a governor driven by said transmission and regulating the pressure of liquid from said source in accordance with the speed of rotation of said governor, a shift valve train, said train including a shift valve member for controlling the supply of fluid from said source to said friction engaging means, said shift valve having a plurality of positions for the supply of fluid to and exhaust of fluid from selected friction engaging devices for determining the gear ratio between said input and said output, said train including an assembly of sliding members subject to regulated pressure from said governor to move said shift valve in one direction, stop means for successively arresting movement of component parts of said assembly whereby increasing pressure from said governor acts on successively smaller areas of said assembly to move said shift valve from first position to successive positions thereof, means for supplying fluid from said manually operated regulator valve to said shift valve to oppose movement thereof by the pressure supplied to said assembly by said governor, said train including a stop plug normally positioned at the end of the path of movement of said shift valve in one direction, a manual control valve for supplying fluid from said source to move said stop plug to either of two positions defining different limited paths of movement of said shift valve in said one direction, a piston member movable in the path of movement of said train, said piston being subject to pressure from said manually operated regulator valve to assist pressure from said governor to delay movement of said shift valve from its second position to its first position.

52. In a transmission, a power driven input, an output, gearing intermediate said input and said output, hydraulically actuated friction engaging devices for conditioning said gear to establish a plurality of gear ratios between said input and said output, a source of fluid under pressure, manually operated valve means for regulating the pressure of liquid from said source, a governor driven by said transmission and regulating the pressure of liquid from said source in accordance with the speed of rotation of said governor, a shift valve train, said train including a shift valve member for controlling the supply of fluid from said source to said friction engaging means, said shift valve having a plurality of positions for the supply of fluid to and exhaust of fluid from selected friction engaging devices for determining the gear ratio between said input and said output, said train including an assembly of telescoped sliding members the end areas of which are subject to regulated pressure from said governor, spaced stop members for successively arresting movement of said sliding members whereby increasing pressure from said governor acts on successively smaller areas to move said shift valve from first position to successive positions thereof, mean for supplying fluid from said manually operated regulator valve to said shift valve to oppose movement thereof by the pressure supplied to said assembly by said governor, said train including a stop plug normally positioned at the end of the path of movement of said shift valve in one direction, a manual control valve for supplying fluid from said source to move said stop plug to either of two positions defining different limited paths of movement of said shift valve in said one direction, a piston member movable in the path of movement of said train, said piston being subject to pressure from said manually operated regulator valve to assist pressure from said governor to delay movement of said shift valve from its second position to its first position.

References Cited in the file of this patent

UNITED STATES PATENTS

| | | |
|---|---|---|
| 1,842,798 | Rauen | Jan. 26, 1932 |
| 2,120,104 | Livermore | June 7, 1938 |
| 2,241,680 | Taylor | May 13, 1941 |
| 2,510,469 | Greenlee | June 6, 1950 |
| 2,516,208 | Hasbany | July 25, 1950 |
| 2,530,200 | Hobbs | Nov. 14, 1950 |
| 2,578,308 | Iavelli | Dec. 11, 1951 |
| 2,643,664 | Willet | June 30, 1953 |
| 2,651,949 | Barnes | Oct. 7, 1953 |
| 2,655,169 | Towler et al. | Oct. 13, 1953 |
| 2,749,775 | Simpson | June 12, 1956 |
| 2,757,552 | English | Aug. 7, 1956 |
| 2,854,862 | Foerster | Oct. 7, 1958 |

FOREIGN PATENTS

| | | |
|---|---|---|
| 765,354 | France | June 8, 1934 |